United States Patent
Bradley et al.

(10) Patent No.: US 12,056,735 B2
(45) Date of Patent: Aug. 6, 2024

(54) SYSTEMS AND METHODS OF PROVIDING ALTERNATIVE ADVERT (AA) QUERY ITEMS AND AA OFFERS FOR AN AA SYSTEM

(71) Applicant: Rivit TV, Inc., Los Angeles, CA (US)

(72) Inventors: Wade Bradley, Los Angeles, CA (US); Shrikesh Karunakaran Pillai, Thousand Oaks, CA (US)

(73) Assignee: Rivit TV, Inc., Los Angeles, CA (US)

( * ) Notice: Subject to any disclaimer, the term of this patent is extended or adjusted under 35 U.S.C. 154(b) by 0 days.

(21) Appl. No.: 17/449,756

(22) Filed: Oct. 1, 2021

(65) Prior Publication Data
US 2023/0005018 A1   Jan. 5, 2023

Related U.S. Application Data

(60) Provisional application No. 63/214,191, filed on Jun. 23, 2021.

(51) Int. Cl.
*G06Q 30/0251* (2023.01)
*G06F 16/9538* (2019.01)
(Continued)

(52) U.S. Cl.
CPC ..... *G06Q 30/0256* (2013.01); *G06F 16/9538* (2019.01); *H04N 21/254* (2013.01); *H04N 21/25883* (2013.01); *H04N 21/812* (2013.01)

(58) Field of Classification Search
CPC .................................................. G06Q 30/0256
See application file for complete search history.

(56) References Cited

U.S. PATENT DOCUMENTS 5,821,926 A    10/1998   Arita
6,826,351 B1   11/2004   Tsujisawa et al.
(Continued)

FOREIGN PATENT DOCUMENTS

CN    105247551 A    1/2016

OTHER PUBLICATIONS

S. Yang, L. An, M. Kafai and B. Bhanu, "To skip or not to skip? A dataset of spontaneous affective response of online advertising (SARA) for audience behavior analysis," 2015 11th IEEE International Conference and Workshops on Automatic Face and Gesture Recognition (FG), Ljubljana, Slovenia, 2015 (Year: 2015).*

(Continued)

*Primary Examiner* — Ilana L Spar
*Assistant Examiner* — Melinda Gieringer
(74) *Attorney, Agent, or Firm* — Womble Bond Dickinson (US) LLP

(57) ABSTRACT

Methods and systems of providing alternative advert (AA) query items for an AA system are disclosed. A request is received to generate an AA query. In response to the request, it is determined whether a percentage of scoreable AA query items for which a viewer has a known or derived preference exceeds a threshold value. Each scoreable AA query item has an assigned equity score and an assigned viewer-item affinity score. In response to determining that the percentage of scoreable AA query items exceeds the threshold value, one or more first AA query types are determined to create for the viewer. The requested AA query is sent. A response to the sent AA query is received. Equity scores and viewer-item affinity scores of total scoreable AA query items are updated based on the response.

26 Claims, 17 Drawing Sheets

(51) Int. Cl.
    *H04N 21/254*    (2011.01)
    *H04N 21/258*    (2011.01)
    *H04N 21/81*    (2011.01)

(56) References Cited

U.S. PATENT DOCUMENTS

| | | |
|---|---|---|
| 8,332,886 B2 | 12/2012 | Lanza et al. |
| 8,819,726 B2 | 8/2014 | Wetzer et al. |
| 8,934,758 B2 | 1/2015 | Meijer |
| 8,990,102 B1 | 3/2015 | Mowry |
| 9,032,298 B2 | 5/2015 | Segal et al. |
| 9,049,259 B2 | 6/2015 | Rathod |
| 9,369,778 B2 | 6/2016 | Sangal |
| 9,386,328 B1 | 7/2016 | Crane et al. |
| 9,448,619 B1 | 9/2016 | Kerns et al. |
| 9,503,691 B2 | 11/2016 | Lawrence-Apfelbaum et al. |
| 9,633,363 B2 | 4/2017 | Price et al. |
| 9,635,438 B2 | 4/2017 | Mandalia et al. |
| 9,712,788 B2 | 7/2017 | Downey et al. |
| 9,930,425 B2 | 3/2018 | Sangal |
| 10,061,742 B2 | 8/2018 | Lang et al. |
| 10,284,921 B2 | 5/2019 | Bhogal et al. |
| 11,127,048 B2 | 9/2021 | Publicover et al. |
| 2002/0108125 A1 | 8/2002 | Joao |
| 2002/0171670 A1 | 11/2002 | Clernock et al. |
| 2003/0149621 A1 | 8/2003 | Shteyn |
| 2003/0172376 A1 | 9/2003 | Coffin, III |
| 2005/0060748 A1 | 3/2005 | Berman et al. |
| 2005/0149880 A1 | 7/2005 | Postrel |
| 2005/0216932 A1 | 9/2005 | Danker |
| 2006/0085816 A1 | 4/2006 | Funk et al. |
| 2006/0121434 A1* | 6/2006 | Azar ............... G06Q 30/0203 434/350 |
| 2007/0038931 A1 | 2/2007 | Allaire et al. |
| 2007/0300263 A1 | 12/2007 | Barton et al. |
| 2008/0015937 A1 | 1/2008 | Perkowski et al. |
| 2008/0092159 A1 | 4/2008 | Dmitriev et al. |
| 2008/0115161 A1 | 5/2008 | Kurzion |
| 2009/0006191 A1* | 1/2009 | Arankalle ............ H04N 21/454 705/14.71 |
| 2009/0210899 A1 | 8/2009 | Lawrence-Apfelbaum et al. |
| 2009/0249386 A1* | 10/2009 | Shan ................... G06Q 30/02 725/32 |
| 2009/0300670 A1 | 12/2009 | Barish |
| 2010/0061709 A1 | 3/2010 | Agnihotri et al. |
| 2010/0251296 A1 | 9/2010 | Kim et al. |
| 2011/0109648 A1 | 5/2011 | Roberts et al. |
| 2011/0119726 A1 | 5/2011 | Delorme et al. |
| 2011/0126102 A1 | 5/2011 | Archer |
| 2011/0166932 A1 | 7/2011 | Smith et al. |
| 2011/0219400 A1 | 9/2011 | Candelore et al. |
| 2011/0302601 A1 | 12/2011 | Mayo et al. |
| 2012/0029987 A1 | 2/2012 | Kusumoto et al. |
| 2012/0084811 A1 | 4/2012 | Thompson et al. |
| 2012/0166267 A1 | 6/2012 | Beatty et al. |
| 2013/0070275 A1 | 3/2013 | Kawashima |
| 2013/0080434 A1* | 3/2013 | Subasic ............... G06Q 30/02 707/E17.046 |
| 2013/0080892 A1 | 3/2013 | Okajo |
| 2013/0101272 A1 | 4/2013 | Plotnick et al. |
| 2013/0111519 A1 | 5/2013 | Rice et al. |
| 2013/0185751 A1 | 7/2013 | Medvedenko |
| 2013/0191223 A1 | 7/2013 | Harris et al. |
| 2013/0298147 A1 | 11/2013 | Klein et al. |
| 2013/0325627 A1* | 12/2013 | Kimmerling ........... G06F 16/24 705/14.66 |
| 2014/0007155 A1 | 1/2014 | Vemparala et al. |
| 2014/0033095 A1 | 1/2014 | Koba et al. |
| 2014/0082643 A1* | 3/2014 | Dmitriev ......... H04N 21/25435 725/1 |
| 2014/0164102 A1* | 6/2014 | Bell .................. G06Q 30/0255 705/14.45 |
| 2014/0195675 A1 | 7/2014 | Silver |
| 2014/0236870 A1* | 8/2014 | Dillon .................... G06N 5/02 706/46 |
| 2014/0258268 A1 | 9/2014 | Woods |
| 2014/0351843 A1 | 11/2014 | Theriault |
| 2015/0026715 A1 | 1/2015 | Bernstein et al. |
| 2015/0032519 A1 | 1/2015 | Brooks et al. |
| 2015/0032551 A1 | 1/2015 | Ekambaram et al. |
| 2015/0046944 A1 | 2/2015 | Delorme et al. |
| 2015/0294356 A1 | 10/2015 | Devecka |
| 2015/0326891 A1 | 11/2015 | Austin |
| 2016/0027066 A1 | 1/2016 | Sachson et al. |
| 2016/0034990 A1 | 2/2016 | Kannair |
| 2016/0205439 A1 | 7/2016 | Bonovich et al. |
| 2016/0219330 A1 | 7/2016 | Parker |
| 2016/0249111 A1 | 8/2016 | Sangal |
| 2017/0078719 A1 | 3/2017 | Bettendorf et al. |
| 2017/0188116 A1 | 6/2017 | Major et al. |
| 2017/0195745 A1 | 7/2017 | Kumar Bvn et al. |
| 2018/0374121 A1 | 12/2018 | Lim et al. |
| 2019/0385219 A1 | 12/2019 | Ouyang |
| 2020/0250706 A1 | 8/2020 | Avetisian |
| 2021/0136458 A1 | 5/2021 | Carney et al. |
| 2021/0314672 A1 | 10/2021 | Aher et al. |
| 2021/0409822 A1 | 12/2021 | Aher et al. |
| 2022/0004358 A1 | 1/2022 | Facey et al. |
| 2022/0174336 A1 | 6/2022 | Hardee et al. |

OTHER PUBLICATIONS

U.S. Appl. No. 17/449,741, filed Oct. 1, 2021.
U.S. Appl. No. 17/449,743, filed Oct. 1, 2021.
Leslie K. John et al., Ads That Don't Overstep, Harbard Business Review, Jan.-Feb. 2018, 14 pp. total, downloaded from https://hbr.org/2018/01/ads-that-dont-overstep.
Wikipedia, "Targeted advertising", last edited on Dec. 18, 2021, 22 pp. total, downloaded from https://en.wikipedia.org/wiki/Targeted_advertising.
Foster J. Provost et al., "Audience Selection for On-Line Brand Advertising: Privacy-Friendly Social Network Targeting", Proceedings of the 15th ACM SIGKDD International Conference on Knowledge Discovery and Data Mining, Paris, France, Jul. 28-Jul. 1, 2009, 9 pp. total.
J. Fingas, "Brave browser lets you see opt-in ads in exchange for rewards", engadget.com, Apr. 24, 2019, 7 pp. total, downloaded from https://www.engadget.com/2019-04-24-brave-ads.html.
brave.com, "Brave Rewards, Get rewarded fro browsing and support your favorite content creators", undated, 13 pp. total, downloaded Dec. 29, 2021 from https://brave.com/brave-rewards/.
Barbara Katz, "Development and Current Issues of Interactive Television in the UK", 2004, 6 pp. total, downloaded from https://citeseerx.ist.psu.edu/viewdoc/download?doi=10.1.1.119.8798&rep=rep1&type=pdf.
Ross Benes, "The dominance of ad-free streaming poses marketing problems", emarketer.com, Nov. 16, 2020, 8 pp. total, downloaded from https://www.emarketer.com/content/dominance-of-ad-free-streaming-poses-marketing-problems.
www.playon.tv website, 2021, 7 pp. total.
Beverly Conger Sonoda, "On Experiencing the Commercial Interruption and Understanding Commercial Sponsorship's Effects on Television", A dissertation presented to the faculty of Saybrook Institute, San Francisco, CA, Mar. 1998, 220 pp. total, downloaded from https://www.interruptions.net/literature/Sonoda-PhD.pdf.
Yunhong Zhou et al., "Large-scale Parallel Collaborative Filtering for the Netflix Prize", Proceedings of the 4th AAIM International Conference on Algorithmic Aspects of Information and Management, Shanghai, China, Jun. 23-24, 2008, 12 pp. total.
Sahar Karat, "How do you build a 'People who bought this also bought that'-style recommendation engine", Dec. 16, 2015, 12 pp. total, downloaded from https://datasciencemadesimpler.wordpress.com/tag/alternating-least-squares/.
Office Action Dated Oct. 5, 2022; U.S. Appl. No. 17/449,743; 19 pp. total.
Office Action Dated Apr. 21, 2023; U.S. Appl. No. 17/449,743; 18 pp. total.
Office Action Dated Mar. 9, 2023; U.S. Appl. No. 17/449,741; 35 pages total.

(56) References Cited

OTHER PUBLICATIONS

International Search Report and Written Opinion of the International Searching Authority; International Application No. PCT/US2022/033826; 20 pp. total.
Invitation to Pay Additional Fees Dated Oct. 14, 2022; International Application No. PCT/US2022/033826; 2 pp total.
Notice of Allowance Dated Oct. 25, 2023; U.S. Appl. No. 17/449,743; 16 pp total.
Office Action Dated Dec. 8, 2023; U.S. Appl. No. 17/948,120; 55 pp total.
Office Action Dated Feb. 26, 2024; U.S. Appl. No. 17/449,741; 34 pp total.

* cited by examiner

FIGURE 13

| High score query item 1415 | High score query item 1415 |
|---|---|
| Medium score query item 1420 | Medium score query item 1420 |
| Low score query item 1425 | Low score query item 1425 |

1410

| High score query item 1415 | Random selection 1455 |
|---|---|
| Gender Biased 1460 | High score query item 1415 |
| Random selection 1455 | Gender Biased 1460 |

SYSTEMS AND METHODS OF PROVIDING ALTERNATIVE ADVERT (AA) QUERY ITEMS AND AA OFFERS FOR AN AA SYSTEM

CROSS REFERENCE TO RELATED APPLICATIONS

This application claims the benefit of U.S. Provisional Application No. 63/214,191 filed on Jun. 23, 2021, the disclosure of which is incorporated herein by reference.

TECHNICAL FIELD

The present disclosure relates generally to the field of video-on-demand streaming and more specifically to video-on-demand advertising.

BACKGROUND

Most television and video-on-demand (VOD) viewers express dissatisfaction with commercial interruptions. Commercials and adverts interrupt the viewing experience, are usually seen by the viewers as a waste of the viewers' time, often have little interest to the viewers, and too frequently repeat themselves. Viewers resent the lack of control over the choice and display mechanism for adverts. Major VOD services, such as Netflix, Hulu and Amazon Prime provide commercial-free viewing for a premium subscription monthly fee. Smaller VOD services usually offer video content with commercials without requiring a subscription fee.

An advertising VOD service (AVOD), provided by a VOD publisher, wishes to maximize its revenue by giving viewers a positive experience and satisfying the needs of its advertisers. The advertisers prefer to target specific demographics but the viewers are usually reluctant to volunteer personal information.

In U.S. Pat. No. 9,503,691 entitled "Methods and apparatus for enhanced advertising and promotional delivery in a network" granted on Nov. 12, 2016, Lawrence-Apfelbaum discloses an enhanced advertising selection and delivery system in a communications network, such as a cable television network. Lawrence-Apfelbaum states that, in one embodiment, a viewer may either select to have an advertisement: (i) made available after the program which is currently being viewed has ended, or (ii) e-mailed or otherwise forwarded to the viewer. Although Lawrence-Apfelbaum describes many useful approaches, Lawrence-Apfelbaum does not adequately address the specific needs of the modern-day, VOD publisher; the modern-day VOD viewers and the advertisers.

FIG. 1 shows an example of a modern-day, conventional VOD service 100. A viewer 105 interacts with viewer device 110. The viewer device 110 can be any of a variety of device types, such as a television augmented with an internal or external streaming device such as a Roku device. The viewer 105 interacts with the viewer device 110 using a controller (not shown) and selects video content to view. A content delivery network (CDN) or content delivery service 120 streams video data to viewer device 110. A CDN is a highly-distributed platform of servers that helps minimize delays in streaming video content by reducing the physical distance between the server and the viewer. This helps viewers around the world view the same high-quality content without slow loading times. The VOD server 130 communicates with the viewer device accepting requests for video content and sending the video content in response. The VOD server 130 performs various functions including viewer profile management, content management, advert management and advert revenue and reporting. Viewer profile management keeps track of viewer information, such as content viewed and any viewer sign-in information. Content management keeps track of what video content is available for streaming. The VOD server 130 communicates with content partners 140 to receive new video content. The advert management function keeps track of available adverts. The VOD server 130 inserts adverts into the video content stream that it sends to viewer device 110. The viewer has no control over what adverts are inserted. The VOD service advertiser is normally unable to target a desired demographic. The advert revenue and reporting function keeps track of what adverts have been sent to the viewers, so that the VOD service can bill the advertisers. The VOD server 130 communicates with Ad servers and Ad exchange servers over a supply-side-platform (SSP) Ad network 150 to obtain video adverts for insertion. The VOD server also typically communicates with multiple third-party tools 160.

However, VOD viewers, VOD publishers and advertisers want a system that allows viewers some control over the choice and presentation of advertising information and allows advertisers to target specific demographics.

BRIEF DESCRIPTION OF THE DRAWINGS

The drawings are made to point out the unique and inventive nature of the disclosed application and to distinguish the application from prior art. The objects, features and advantages of the application are detailed in the description taken together with the drawings. Within the accompanying drawings, various embodiments in accordance with the present disclosure are illustrated by way of example and not by way of limitation. It is noted that like reference numerals denote similar elements throughout the drawings.

FIG. 13 is a diagram showing an example of how the alternative ad system determines a viewer's gender or sexual orientation according to an embodiment.

FIG. 14 is a diagram showing an example of how the alternative ad system uses alternative ad query item positioning according to an embodiment.

DETAILED DESCRIPTION

Figure 1:
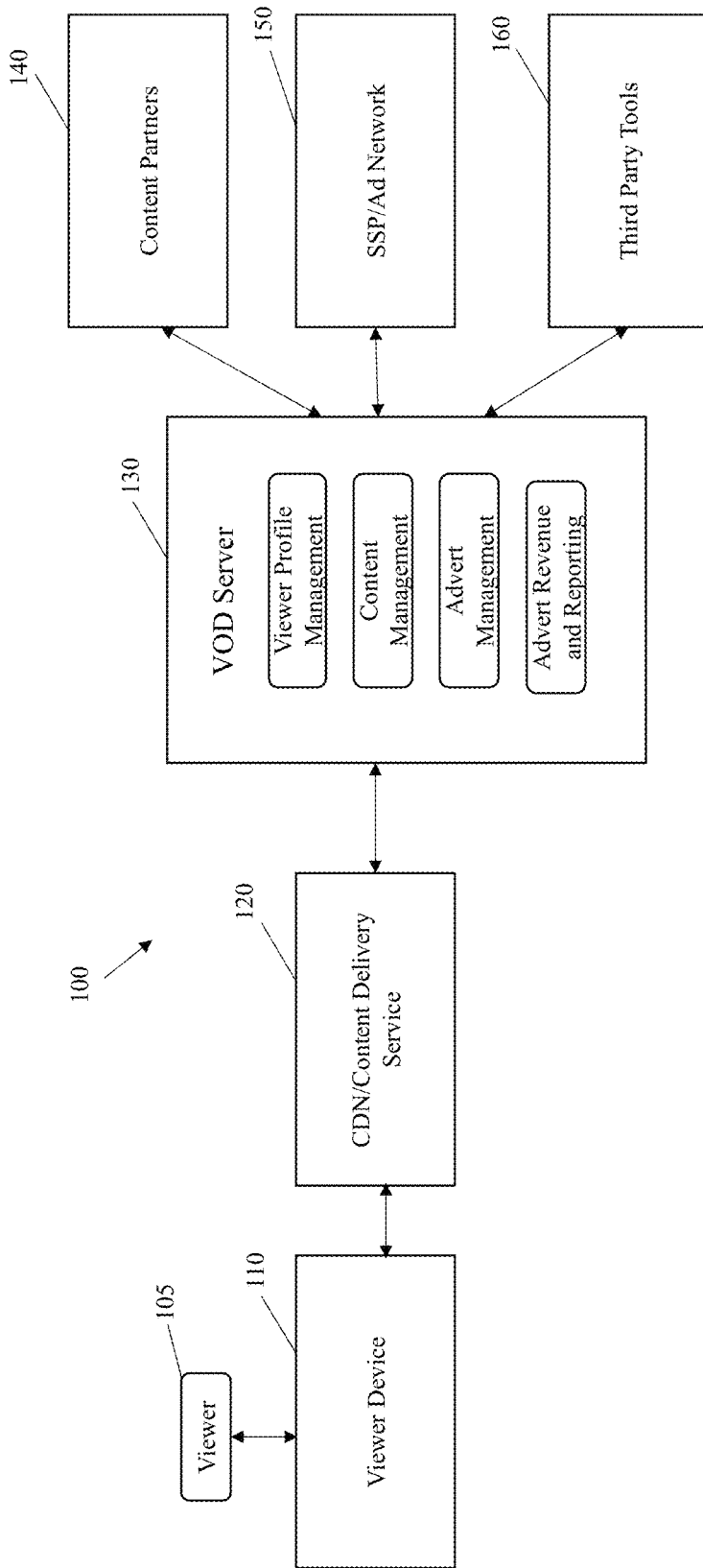
FIG. 1 is a diagram showing a conventional VOD system.

Reference will now be made in detail to various embodiments in accordance with the present disclosure, examples of which are illustrated in the accompanying drawings. While described in conjunction with various embodiments, it will be understood that these various embodiments are not intended to limit the present disclosure. On the contrary, the present disclosure is intended to cover alternatives, modifications and equivalents, which may be included within the scope of the present disclosure as construed according to the claims. Furthermore, in the following detailed description of various embodiments in accordance with the present disclosure, numerous specific details are set forth in order to provide a thorough understanding of the present disclosure. However, it will be evident to one of ordinary skill in the art that the present disclosure may be practiced without these specific details or with equivalents thereof. In other instances, well known methods, procedures, components, and circuits have not been described in detail so as not to unnecessarily obscure aspects of the present disclosure.

Some portions of the detailed descriptions that follow are presented in terms of procedures, logic blocks, processing, and other symbolic representations of operations on data bits within a computer memory. These descriptions and representations are the means used by those skilled in the data processing arts to most effectively convey the substance of their work to others skilled in the art. In the present disclosure, a procedure, logic block, process, or the like, is conceived to be a self-consistent sequence of operations or instructions leading to a desired result. The operations are those utilizing physical manipulations of physical quantities. Usually, although not necessarily, these quantities take the form of electrical or magnetic signals capable of being stored, transferred, combined, compared, and otherwise manipulated in a computing system.

It should be borne in mind, however, that all of these and similar terms are to be associated with the appropriate physical quantities and are merely convenient labels applied to these quantities. Unless specifically stated otherwise as apparent from the following discussions, it is appreciated that throughout the present disclosure, discussions utilizing terms such as "implementing," "inputting," "operating," "deciding," "detecting," "notifying," "aggregating," "coordinating," "applying," "comparing," "engaging," "predicting," "recording," "analyzing," "determining," "identifying," "classifying," "generating," "extracting," "receiving," "processing," "acquiring," "performing," "producing," "providing," "prioritizing," "arranging," "matching," "measuring," "storing," "signaling," "proposing," "altering," "creating," "computing," "loading," "inferring," or the like, refer to actions and processes of a computing system or similar electronic computing device or processor. The computing system or similar electronic computing device manipulates and transforms data represented as physical (electronic) quantities within the computing system memories, registers or other such information storage, transmission or display devices.

Various embodiments described herein may be discussed in the general context of computer-executable instructions residing on some form of computer-readable storage medium, such as program modules, executed by one or more computers or other devices. By way of example, and not limitation, computer-readable storage media may comprise non-transitory computer storage media and communication media. Generally, program modules include routines, programs, objects, components, data structures, etc., that perform particular tasks or implement particular abstract data types. The functionality of the program modules may be combined or distributed as desired in various embodiments.

Computer storage media includes volatile and nonvolatile, removable and non-removable media implemented in any method or technology for storage of information such as computer-readable instructions, data structures, program modules or other data. Computer storage media includes, but is not limited to, random access memory (RAM), read only memory (ROM), electrically erasable programmable ROM (EEPROM), flash memory or other memory technology, compact disk ROM (CD-ROM), digital versatile disks (DVDs) or other optical storage, magnetic cassettes, magnetic tape, magnetic disk storage or other magnetic storage devices, or any other medium that can be used to store the desired information and that can be accessed to retrieve that information.

Communication media can embody computer-executable instructions, data structures, and program modules, and includes any information delivery media. By way of example, and not limitation, communication media includes wired media such as a wired network or direct-wired connection, and wireless media such as acoustic, radio frequency (RF), infrared and other wireless media. Combinations of any of the above can also be included within the scope of computer-readable media.

According to some embodiments, systems and methods of providing alternative advert (AA) query items for an AA system are described. A request may be received to generate an AA query. In response to the request, it may be determined whether a percentage of scoreable AA query items for which a viewer has a known or derived preference exceeds a threshold value. Each scoreable AA query item may have an assigned equity score and an assigned viewer-item affinity score. In response to determining that the percentage of scoreable AA query items exceeds the threshold value, one or more first AA query types may be determined to create for the viewer. The requested AA query may be sent. A response to the sent AA query may be received. Equity scores and viewer-item affinity scores of total scoreable AA query items may be updated based on the response, where the total scoreable AA query items may include the scoreable AA query items for which the viewer has the known or derived preference.

In an embodiment, in response to determining that the percentage of scoreable AA query items does not exceed the threshold value, one or more second AA query types are determined to create for the viewer.

In an embodiment, wherein the first AA query types are determined based on at least one of the following: the viewer-item affinity scores of the scoreable AA query items, demographic attribute of the scoreable AA query items, or at least one pseudo-random AA query item.

In an embodiment, the second AA query types are determined based on at least one of the following: the equity scores of the scoreable AA query items, demographic attribute of the scoreable AA query items, at least one pseudo-random AA query item, viewer preference information of the viewer, or bidding rules.

In an embodiment, to determine the percentage of scoreable AA query items for which the viewer has the known or derived preference, a number of scoreable AA query items for which the viewer has the known or derived preference may be counted, and the counted number of scoreable AA query items for which the viewer has the known or derived preference may be divided by a total number of scoreable AA query items.

In an embodiment, an equity score and a viewer-item affinity score for each AA query item having unknown equity and viewer-item affinity scores may be respectively derived or predicted based on a control parameter.

In an embodiment, to respectively derive or predict the equity score and the viewer-item affinity score for each AA query item having the unknown equity and viewer-item affinity scores, the equity score may be assigned to the AA query item based on at least one of: how often the viewer has seen the AA query item, how often the viewer has selected the AA query item, a ratio of the AA query item being selected to the AA query item being seen, or an amount of revenue the AA query item has generated, and the viewer-item affinity score may be assigned to the AA query item based at least on responses of the viewer to the AA query item.

In an embodiment, the responses of the viewer to the AA query item include at least one of: whether the viewer has accepted an AA offer associated with the AA query item, whether the viewer has opened the AA offer associated with the AA query item, whether the viewer has completed a selection query and selected the AA query item, whether the viewer has completed a ranking query and ranked the AA query item, whether the viewer did not complete an AA query but selected the AA query item prior to selecting a graphical user interface element (e.g., a button) for rejecting an AA offer to watch advert-free content, or whether the viewer has seen the AA query item without selecting the AA query item.

In an embodiment, the viewer-item affinity score may be assigned to the AA query item further based on a number of times a particular response of the viewer has occurred.

In an embodiment, to assign the viewer-item affinity score to the AA query item, a first viewer-item affinity score may be assigned if a rule disqualifies the viewer from seeing the AA query item, a second viewer-item affinity score may be assigned if the viewer has ranked the AA query item better than last place or selected the AA query item prior to selecting a graphical user interface element for rejecting an AA offer to watch advert-free content, the second viewer-item affinity score may be assigned based on a first derived preference of the viewer towards the AA query item, a third viewer-item affinity score may be assigned if the viewer has ranked the AA query item in first place in a completed AA ranking survey, the third viewer-item affinity score may be assigned based on a second derived preference of the viewer towards the AA query item, a fourth viewer-item affinity score may be assigned if the viewer has selected the AA query item in a completed AA selection query, or a fifth viewer-item affinity score may be assigned if the viewer has completed an AA query, received an AA offer and opened or accepted the AA offer.

In an embodiment, the first AA query types and the second AA query types to create for the viewer are each determined based on a data table.

In an embodiment, to derive or predict the equity score and the viewer-item affinity score for each AA query item having the unknown equity and viewer-item affinity scores, the viewer-item affinity score for the AA query item is derived using a viewer-item affinity score of another AA query item.

In an embodiment, the viewer-item affinity score is assigned to the AA query item based on a viewer-item affinity matrix indicating the viewer's affinity to each of the total scoreable AA query items.

In an embodiment, the viewer-item affinity score is assigned to the AA query item by performing cosine similarity, L1/L2 Norm, matrix factorization, or singular value decomposition (SVD) on the viewer-item affinity matrix.

According to some embodiments, an alternative ad (AA) system enhances a viewer's VOD content viewing experience by allowing the viewer to provide information in lieu of watching adverts during the playing of video content. The viewer immediately benefits by spending seconds entering information instead of having to watch minutes of adverts. Advertisers benefit because each time a viewer expresses an opinion, the viewer reinforces or even creates a preference for their brand and products. The AA system provides AA offers based on the viewer's entered information, video preferences and profile. The AA system provides different AA offer delivery options including email, short message service (SMS), and text.

The AA system provides an AA service to a viewer wanting to watch VOD. The AA system creates and displays AA queries to gather information from the viewer. The AA system creates and displays AA queries of different AA query types. Each AA query has one or more AA query items which the viewer can select to show a preference.

Figure 2:
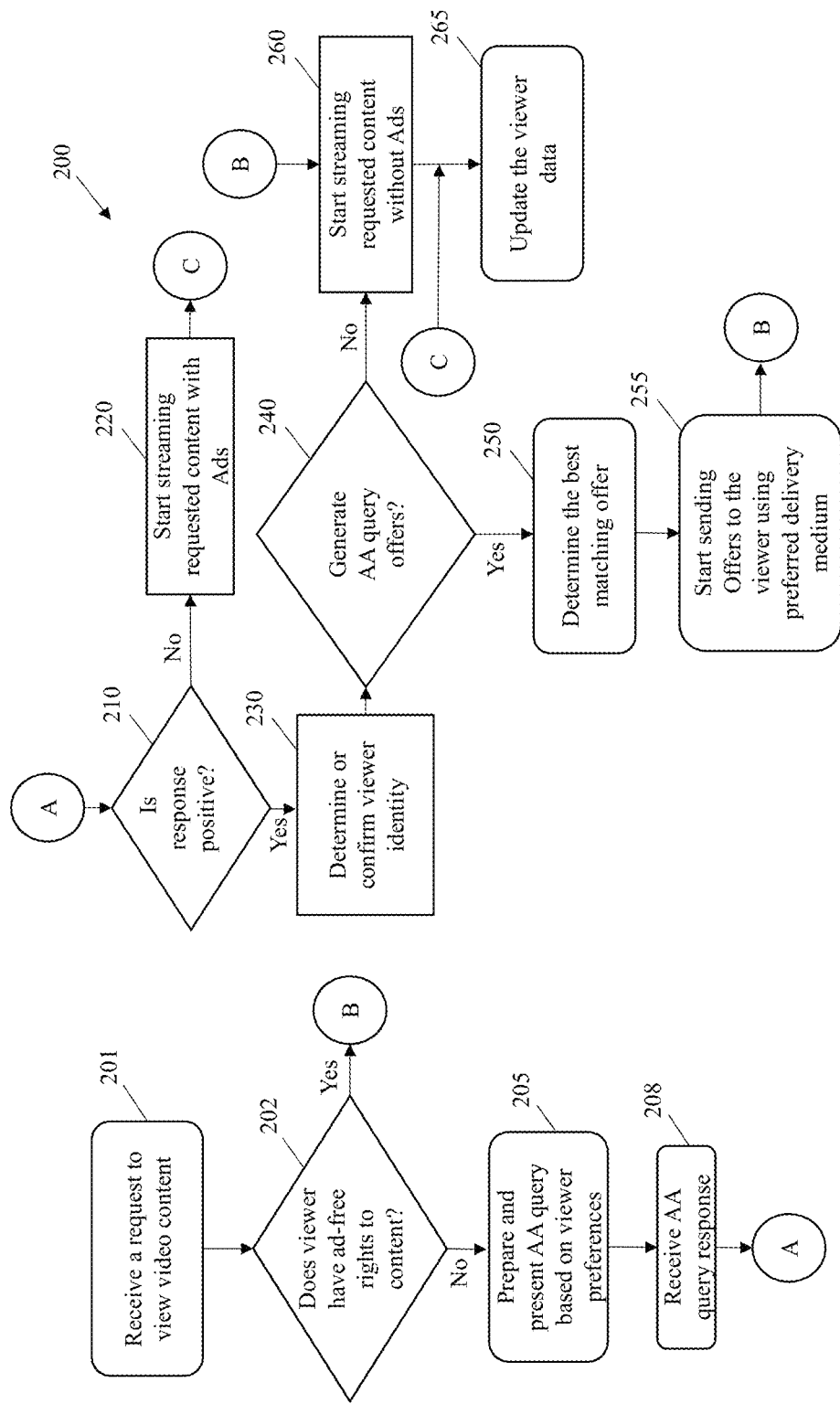
FIG. 2 is a flowchart showing a process performed by an alternative advertising (or alternative ad) system according to an embodiment.

FIG. 2 is a flowchart showing a process performed by an AA system according to an embodiment. Process 200 may be performed by processing logic that includes hardware (e.g. circuitry, dedicated logic, etc.), software (e.g., embodied on a non-transitory computer readable medium), or a combination thereof. For example, process 200 may be performed by AA system 300 of FIG. 3. Referring to FIG. 2, in operation 201, the AA system receives a request to view specific video content. In operation 202, the AA system determines whether the viewer has ad-free rights to watch that specific video content. If the viewer has previously requested that same video content, has opted to view the content advert-free and provided the information requested by an AA query, the AA system allows the viewer to watch the video content advert-free. The AA system may allow a viewer to watch that same video content for a period such as up to 12 months. This allows the viewer to stop the video content, fast-forward, fast-rewind, resume playing and watch it again later. The period that a viewer has for advert-free viewing is controlled by a system control parameter. For example, the AA system may recognize the viewer's identity if the viewer has previously signed in. If the viewer has not signed in, the AA system can use cookies, stored on the viewer device, to identify the viewer. In one embodiment, where the AA system does not use cookies, the AA system asks the viewer to sign-in before the viewer can request video content. If the viewer has the right to view the video content advert-free, the AA system proceeds to operation 260. At operation 260, the AA system starts streaming the video content without adverts. If the viewer does not have the right to view the video content advert-free, the AA system proceeds to operation 205.

In response to the video content viewing request, in operation 205, the AA system prepares an AA query to ask the viewer for information and then presents the AA query to the viewer. This AA query may include a question asking the viewer if he/she wishes to watch the video content without adverts. The AA system prepares the rest of the AA query based on multiple factors including the viewer's past preferences, if any. The AA query can request different types of information such as asking for a preference between or ranking of merchandise categories, advertising brands, or merchandise. The AA query can also ask for information about the viewer, or ask for information that can be used to infer viewer attributes and preferences. The AA query can take multiple forms called AA query types. Most of the viewer devices have only a virtual keyboard, thereby making text entry tedious for most viewers. The AA queries may ask the viewer to select AA query items on the viewer device display. Different AA query types may ask the viewer to select items or to rank order items. Different AA query types may also ask the viewer to select between different classes of AA query items, such as to select among brands or to select among merchandise categories. The AA system selects the AA query based on a variety of deciding factors including: current and past viewer preference or affinity towards a brand, merchandise category, or merchandise; prior AA offer acceptance; market trends and viewer video content choice. The deciding factors also include advertiser/brand preferences including brand rules, AA offer seasonality, past AA offer history, and survey requests. An advertiser can make a survey request, asking the AA system to display an AA query that asks questions about that advertiser's merchandise. The brand rules include rules for displaying items, bidding, making AA offers and for viewer targeting. The deciding factors also include VOD publisher preferences for AA offers that increase VOD publisher revenue. The AA system uses AA query rules to select the AA query type. The AA query rules depend on factors that include: the amount of information known about the specific viewer, the amount of information known about each brand, merchandise category and merchandise preference.

In operation 208, the AA system receives an AA query response to the AA query. In operation 210, the AA system checks the AA query response to determine whether a response included in the AA query response is positive. For example, the AA system continues, at operation 220, if the system receives a negative response to the question included in the AA query asking the viewer if he/she wishes to watch the video content without adverts. The AA system continues, at operation 230, if the system receives a positive response to the question asking the viewer if he/she wishes to watch the video content without adverts. At operation 220, the AA system starts streaming the requested content to the viewer device with inserted video adverts. After operation 220 the AA system proceeds to operation 265 where the system updates the viewer data (e.g., viewer profile and viewer history). The AA system keeps track of AA query answers, AA offers sent, seen and accepted, video content requested and seen and the viewer's affinity towards specific AA query items (e.g., brands, merchandise categories, merchandise) and video content. The AA system may update viewer attributes such as gender or age-range based on the AA query answers.

In operation 230 the AA system determines or confirms the viewer identity. If the viewer has not already signed in, the AA system asks the viewer to either sign-in (with an existing account) or to sign-up creating a new account. The AA system allows the viewer to sign-in or sign-up for an account with the VOD publisher using an email or an existing external account, such as Facebook®, Apple® or Google®. In 240 the AA system determines whether the AA system should generate one or more AA offers. Some AA queries are designed to generate AA offers and some AA queries are designed to gather information in lieu of sending AA offers. In some circumstances, the AA system may be unable to find an appropriate AA offer to send. In FIG. 2, the AA system continues at operation 260 if the AA system decides to not generate an AA offer and the AA system proceeds to operation 250 if the AA system decides to generate an AA offer. The sequence of operations may vary from those shown in FIG. 2. For example, the AA system may start streaming the requested content before the AA system determines the best offer. Also, the AA system may update the viewer data before or after starting the video streaming. In operation 250 the AA system selects the best AA offer or AA offers to send. The AA system uses multiple factors in deciding the best AA offer to send. These deciding factors may include: current and past shown viewer preference or affinity towards a brand, merchandise category, merchandise, prior AA offers and/or video content. The deciding factors may also include advertiser/brand preferences including bidding rules, AA offer seasonality, past AA offer history, and/or viewer targeting rules. The deciding factors may also include VOD publisher preferences for AA offers that increase VOD publisher revenue. In operation 255 the AA system starts sending the selected AA offer or AA offers using the viewer's preferred (or selected) delivery medium or channel. The AA system typically sends the AA offers at separate times, for example, the AA system may send the first AA offer at 7 pm, the second AA offer at 10 pm, the third AA offer at 10 am, etc. An AA system operator may set configuration parameters that control the AA offer delivery times. At operation 260 the AA system starts streaming the requested content to the viewer device without inserted video adverts. At operation 265 the AA system updates the viewer data.

In an embodiment, the AA system receives notification when a viewer has opened an AA offer email, has clicked on a link in an AA offer email or has used an on-line coupon included in an AA offer. The AA system may allocate reward points or reward coins to viewers who have viewed and/or accepted an email AA offer. The rewards points or reward coins can be used in exchange for a variety of benefits including watching video content without adverts, watching premium video content that would otherwise require a fee, or merchandise.

Viewer Scenario Examples

Some of the possible uses of the AA system with example scenarios are described herein below.

A first-time viewer selecting brands. A viewer may start or launch an AA App for the first time and select a VOD show to watch on a portable viewing device (e.g., smartphone, tablet, etc.), television or desktop computer. Before starting to play the VOD content, the AA system may present the viewer with an AA query asking whether the viewer wants to view the show without inserted advertisements. The AA query may also allow the viewer to select a number of brands from a graphic list or named list of brands. If the viewer's response is NO (e.g., by selecting a NO button), the AA system may play a show with inserted advertisements. If the viewer selects the required number of brands and clicks a YES button, the AA system may ask the viewer to either sign-in using an existing VOD publisher account or an external account, such as Facebook®, Apple® or Google® account, or to create a new VOD publisher account using an identification (ID), for example an email ID. After a viewer has signed in, the AA system may store cookies on the viewer device to make further viewer identification easier. In this example, the viewer has selected an action show with car chases. The AA system maintains a database which lists all selections made by all viewers for each show-type. The AA system displays the brands most frequently selected for the current show-type(s). In this example. The AA system displays automobile brands such as Tesla®, Mercedes®, BMW®, Audi®, Ford® and Toyota®.

The viewer may select the required number of brands requested, for example clicks YES, then complete sign-in/sign-up and begin watching the video content advert-free. The AA system may send a number of AA offers to the viewer, to raise awareness or to act as a call-to-action. The AA offers may include special promotional codes, discounts or web links to special AA offers. In this example, the AA system uses emails although the AA system can use other channels such as SMS or text messaging. The AA system may select specific AA offer emails related to the selected brands. The AA system may keep a database that lists AA offers associated with each brand. The AA system may send the highest priority AA offer for each selected brand. As an example, if the viewer selects Tesla, Mercedes and Toyota, the AA system sends AA offers for Tesla®, Mercedes® and Toyota®. In this example, the AA system may send a Tesla AA offer immediately, a Mercedes AA offer three hours later and a Toyota AA offer three hours after that.

Selecting merchandise categories. The viewer may sign in and select a comedy show to watch. The AA system may want to discover what types of AA offers the viewer might have interest in. In an embodiment, before starting to play the VOD content, the AA system presents the viewer with an AA query asking whether the viewer wants to view the show without advertisements. The AA query allows the viewer to select a number of merchandise categories. If the viewer selects the required number of merchandise categories and clicks the YES button, the viewer can proceed to watch the show without adverts. For example, the AA system may ask the viewer to select three merchandise categories from the choice of sneakers, snacks, hats and candy. After the viewer selects snacks, hats and candy, the AA system may send the viewer the best snacks, hats and candy AA offers from advertisers AA offering them. In addition to selecting brands or generic merchandise categories, the AA system can ask the viewer to select brand-specific merchandise categories (e.g., McDonalds's salads, McDonald's sandwiches) or merchandise (e.g., Stargate SG-1, Firefly, Star Trek Discovery).

Selecting ranked merchandise sub-categories. The AA system may want to better understand the types of AA offers the viewer might have interest in. In an embodiment, before starting to play the VOD content, the AA system presents the viewer with an AA query asking whether the viewer wants to view the show without advertisements. The AA system also allows the viewer to select a number of merchandise categories. If the viewer selects one or more merchandise categories, then the AA system presents the viewer with one or more menus of corresponding merchandise sub-categories. The AA system asks the viewer to rank the merchandise sub-categories in order of preferences. For example, the AA system may ask the viewer to select 3 merchandise categories from the choice of sneakers, snacks, hats and candy. After the viewer selects snacks, as an example, the AA system may ask the viewer to rank the merchandise categories of healthy snacks, chips and popcorn. After the viewer selects candy, the AA system may ask the viewer to rank three types of candy in order of preference. After entering the required information, clicking YES and either signing in or signing up, the viewer may proceed to watch the show without adverts. The AA system keeps track of the viewer's merchandise preferences and sends the viewer AA offers from each highest-ranked merchandise sub-category. The AA system uses a database that indicates which AA offers apply to which merchandise categories.

Using different AA ranking surveys. In addition to ranking generic merchandise categories, the AA system may ask the viewer to select brands, brand-specific merchandise categories or merchandise and then ask the viewer to rank brands, brand-specific merchandise categories or merchandise that correspond to the initial selections. For example, multiple advertisers may want to better understand the popularity of new products with its customers. For example, the AA system may ask the viewer to select three items from the choices of McDonalds®, Wendy's®, Taco Bell® and Subway®. If a viewer selects McDonalds, the AA system may ask the viewer to rank different products sold by McDonalds® (e.g., Big Mac®, bacon-cheeseburger and a new meatless sandwich).

Bidding rules. Advertisers can specify bids for competitive situations. For example, a viewer may select the drinks generic merchandise category and then provides a ranking of first Sunny Delight®, second Red Bull® and third Powerade®. Sunny Delight® may bid ten cents to make an AA offer after being ranked first. Powerade® may bid twenty cents to make an AA offer after being ranked first. Red Bull® may bid fifteen cents to make an AA offer after being ranked first and thirty cents to make an AA offer after being ranked second. In an embodiment, the AA system makes an AA offer for Red Bull® because Red Bull® has the highest bid. In an embodiment, the AA system employs a real-time bidding system in which it communicates with third-party servers to solicit and receive bids in real-time.

Finding viewer attributes. Advertisers like to target consumers based on demographics such as gender, age and geographic location. Viewers can be reluctant to divulge personal information like this. After a viewer has watched multiple shows without adverts, the AA system may introduce questions to help determine viewer attributes. The AA system may first try asking directly for the viewer's age range and gender in exchange for watching advert-free content. If direct questions fail, the AA system may infer the viewer's gender, age and other attributes based on the viewer preference for shows, merchandise categories and brands. For example, the AA system may construct menus of male-friendly and female-friendly items for the specific purpose of determining the viewer's gender. If the viewer selects male-friendly items, the AA system concludes that the user is male. The AA system may determine the viewer's geographic location using multiple methods including Internet Protocol (IP) address lookup, asking directly, and inferring from answers to indirect questions. The AA system may also allow the viewer to review and edit viewer profile data through a separate account settings menu. The viewer can use this mechanism to specify options like gender and age, change the method of AA offer delivery (e.g., email, SMS or text), and to opt-out or opt-in to the AA service. If a viewer opts out of the AA service, the AA system may not present AA queries to that viewer and may default to showing content with inserted adverts.

Informational queries. In addition to asking questions about a viewer's attributes, the AA system can be controlled to make other informational queries. For example, the AA system can ask questions such as "did you like the AA offer previously sent to you from Brand X?". An email AA offer may include buttons, such as emoticons, to ask the value of the AA offer to the viewer. In an embodiment, the AA system uses Hypertext Markup Language (HTML) email coding to create visually appealing email content by displaying a variety of colors, images, backgrounds, and fonts. Emoticons can show positive and negative images such as happy and sad faces, thumbs-up and thumbs-down, etc. Clicking a button sends a message to a Uniform Resource Locator (URL) address where a web-site, corresponding to that URL address, records the event and reports back to the AA server. In one embodiment, clicking on a button invokes a script that plays an audible tone or sound. Clicking on the positive and negative images produces different positive and negative audible tones or sounds.

Advertiser rules. Advertiser usually want to target specific viewers. An advertiser may represent a single advertising brand or multiple brands. An advertiser may introduce rules that emphasize demographics. In competitive situations, advertisers make bids to have their brand or merchandise displayed in an AA query or to make an AA offer. For example, a viewer may select "luxury cars" from an AA query asking for preference about merchandise categories. A car maker may bid $3 to make an AA offer on a luxury car to a male viewer aged 40-55. The same car maker may bid only $1 if the viewer is aged 21-29.

Advertising surveys. Advertisers want to gauge interest in their products—especially in new and future products. For example, the VOD publisher may have to decide which television content to purchase or which new, unproduced shows to finance. The VOD publisher directs the AA system to ask viewers for their preferences in unproduced or currently unavailable television shows.

The AA System

Figure 3:
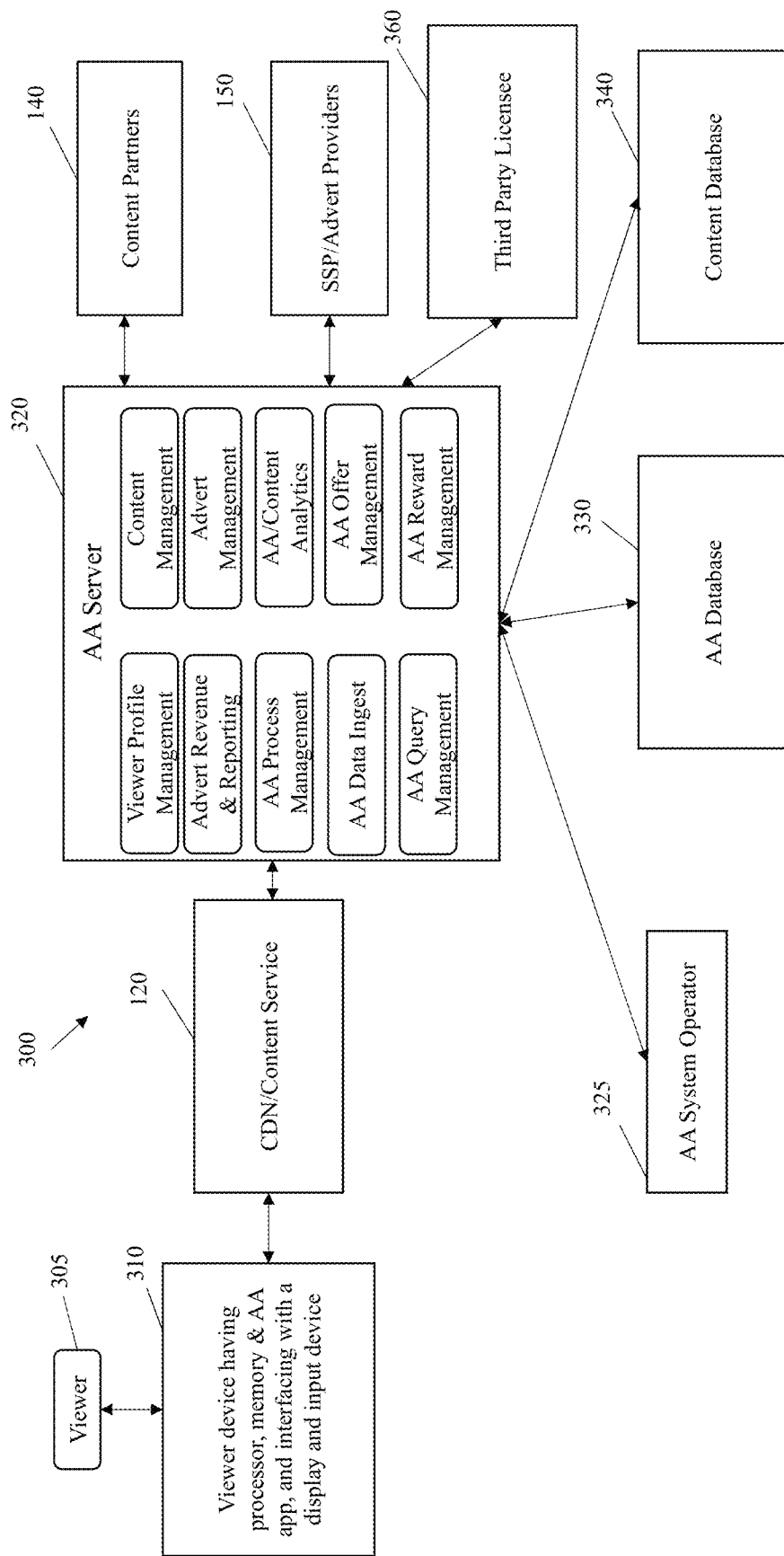
FIG. 3 is a diagram showing components of the alternative ad system according to an embodiment.

FIG. 3 is a diagram showing components of an AA system according to an embodiment. In FIG. 3, AA system 300 may include AA system viewer 305 interacting with a viewer device 310. In an embodiment, viewer device 310 may include a display capable of displaying streaming video content and image overlays and an input device for accepting viewer inputs. In another embodiment, viewer device 310 may interface with the display and input device. The display and input device may be separate from or integrated with the viewer device 310. The viewer device 310 may consist of multiple separate or integrated components. Viewer device 310 can be of multiple types including: a TV with an integrated streaming device, a TV with a separate streaming device, a smart phone, a laptop, a tablet computer, a desktop computer, an automobile computer or a gaming console. The streaming device can be of multiple types including: a Roku device, Amazon Fire Stick, a digital video disc (DVD) player, a set-top-box, or a digital video recorder (DVR). The viewer device 310 runs an AA app. Viewers can normally download the AA app onto their device, although some viewer devices may have the AA app preloaded. The AA app normally uses over-the-top (OTT) features to overlay AA queries and information on top of the viewer's screen or window. The specific display mechanism depends on the type of viewer device. For example, the smartphone AA app may use iOS and Android API, as appropriate, to display AA queries.

With continued reference to FIG. 3, system 300 may include a content delivery network (CDN) or content delivery service 120 that handles data transmission between the viewer device 310 and the AA server 320. A CDN is a highly-distributed platform of servers that helps minimize delays in streaming video content by reducing the physical distance between the server and the viewer. This helps viewers around the world view the same high-quality content without slow loading times. The AA server 320 is a networked computing system, typically in the cloud. The AA server 320 communicates with AA app running on the viewer device 310 accepting requests for video content, and sending the video content in response. The AA server 320 also sends AA queries to the viewer device 310 and receives AA query responses. The AA server 320 may include and perform various functions including viewer profile management, content management, advert management, advert revenue and reporting, AA process management, AA/Content analytics, AA data ingest, AA offer management, AA query management and AA reward management.

The viewer profile management function can handle both conventional VOD system requirements and new AA system requirements. The AA viewer profile management function keeps track of directly-entered, inferred or derived attributes such as age, gender and geographic location. The AA viewer profile management function maintains a record of each viewer's preference for brands, merchandise, merchandise categories and options. The AA viewer profile management function maintains a record of viewing habits, responses to AA queries, AA offers sent to viewers and a record of each viewer's responses to AA offers. The AA viewer profile management function maintains a record of which AA query responses apply to which requested video content. The viewing habits data includes a video-content identifier and the time and day that the viewer requested or watched that content. The AA viewer profile management function receives notifications when a viewer opens an AA offer email, clicks on a link in an AA offer message or uses a discount provided by the AA offer.

The content management function manages the input of new video content (from content partners 140 and third parties), the streaming of video to viewers, and the maintenance of a data dictionary that lists available video content and its associated meta-data. The AA server 320 may store video content in content database 340. The AA server 320 may also maintain a record of each viewer's interaction with video content. The AA server may stream video content from either the content database 340 or directly from content partners 140.

The advert management function manages inserted adverts, bidding and AA offers. The advert revenue and reporting function manages revenue associated with inserted adverts, AA query item display, bidding and AA offers. The AA server receives adverts for insertion into video content from SSP/Advert Providers 150. The VOD publisher charges fees when it displays an inserted advert, makes an AA offer and may charge a fee when it displays a brand, merchandise or merchandise category in an AA query. The advert management, advert revenue and reporting function keeps a record of fees charged, creates financial reports and can track financial trends.

The AA process management function provides overall control of the AA system 300. The AA process management function manages multiple processes or threads which include: a process or thread to handle initial viewer requests to access the AA Server, separate processes or threads to handle communication with each different viewer, processes or threads to handle notifications such as the opening of an email, and processes or threads to communicate with the content partners, third parties and an AA system operator 325.

The AA/Content analytics function analyzes the AA data and the content viewing data, and makes predictions. The AA server predicts viewer preferences for video content, brands, merchandise, merchandise categories and AA offers. The AA server keeps track of issues such as which brand got the most clicks, which brand generated the least revenue and trends.

The AA data ingest function manages the input and maintenance of AA data such as advertisers, brands, brand rules, merchandise, merchandise categories and AA offers. In one embodiment, system 300 may include an AA system operator 325 that interacts directly with the AA server 320. In another embodiment, one or more AA system operators 325 may interact with the AA server 325 remotely. Some AA system operators may have restricted access, such as only having access to specific brand-related data.

The AA offer management function manages AA offer-selection and the sending of AA offers.

The AA query management function manages AA query generation. The AA server uses AA query rules to decide which AA query to present to the viewer.

The AA reward management manages the AA reward system which includes processing notifications of when an AA offer has been opened or accepted, reward point allocation and accounting, and reward point redemption.

The AA server 320 may store data in and retrieve data from AA database 330. The AA database 330 and the content database 340 may each reside on one or more computer storage devices and use one or more database management systems. In one embodiment, the AA database 330 uses a relational database management system and the AA server accesses the AA data using relational database queries.

The AA server 320 can interact with one or more third-party licensees 360. The third-party licensee 360 accesses the functions of the AA server 320 using API calls. The third-party licensee 360 uses the AA server 320 to generate AA queries, and generate AA offers. In one embodiment, each third-party licensee 360 uses its own dedicated AA server 320 that uses its own AA database 330 The AA server 320 may not have access to the viewer profile and content database of the licensee but maintains limited information about the viewer and content in the AA database 330. To satisfy privacy concerns, the AA server 320 may not know the viewer's email address or other viewer information. The third-party licensee may generate an anonymous-email-id for communication with the AA server. The third-party licensee sends the generated AA offers to the viewer.

Figure 4:
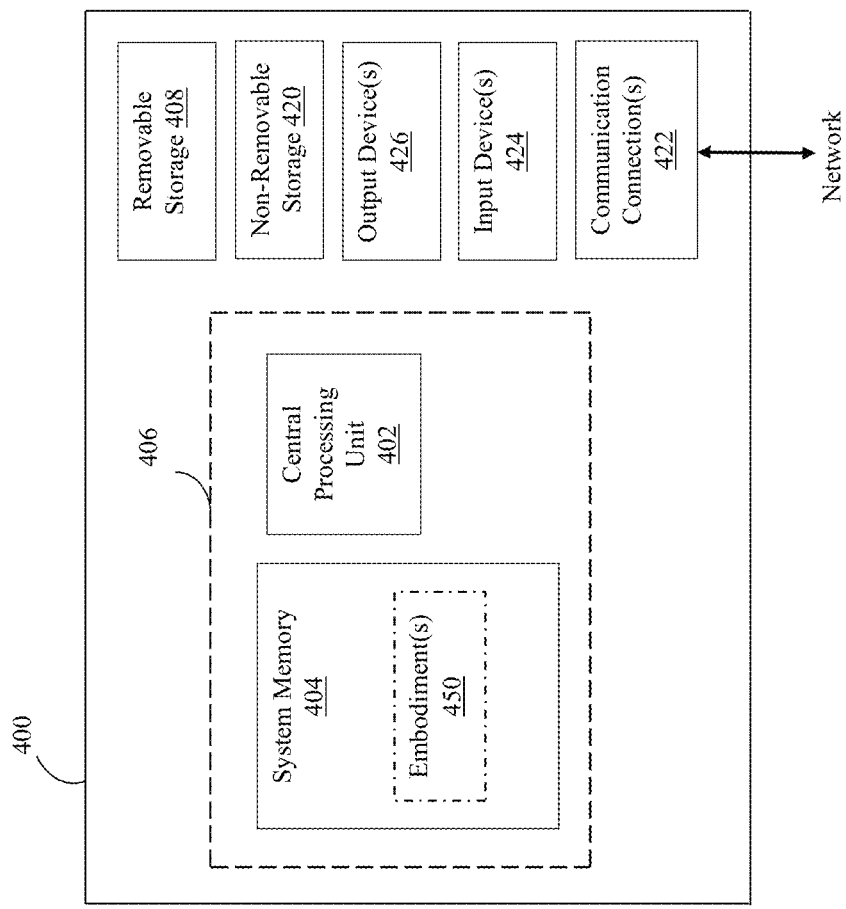
FIG. 4 is a block diagram illustrating a computing system used to implement the alternative ad server and a viewer device.

FIG. 4 is a block diagram of an example of a computing system upon which one or more various embodiments described herein may be implemented. For example, computing system 400 may be used to implement an AA server and a viewer device (as previously described). In an embodiment, the system 400 includes at least one central processing unit 402 and system memory 404, as illustrated in FIG. 4 by dashed line 406. The system 400 may also include additional features and/or functionality. For example, the system 400 may also include additional storage (e.g., removable and/or non-removable) including, but not limited to, magnetic or optical disks or tape. Such additional storage is illustrated in FIG. 4 by removable storage 408 and non-removable storage 420.

The system 400 may also include communications connection(s) 422 that allow the device to communicate with other devices, e.g., in a networked environment using logical connections to one or more remote computers. Furthermore, the system 400 may also include input device(s) 424 such as, but not limited to, a voice input device, touch input device, keyboard, mouse, pen, touch input display device, etc. In addition, the system 400 may also include output device(s) 426 such as, but not limited to, a display device, speakers, printer, etc.

In the example of FIG. 4, the memory 404 includes computer-readable instructions, data structures, program modules, and the like associated with one or more various embodiments 450 in accordance with the present disclosure. Embodiments 450 may include the AA system and the computer-readable instructions and data, and the viewer device AA App computer-readable instructions and data. However, the embodiment(s) 450 may instead reside in any one of the computer storage media used by the system 400 or may be distributed over some combination of the computer storage media or may be distributed over some combination of networked computers but is not limited to such.

It is noted that the computing system 400 may not include all of the elements illustrated by FIG. 4. Moreover, the computing system 400 can be implemented to include one or more elements not illustrated by FIG. 4. It is noted that the computing system 400 can be utilized or implemented in any manner similar to that described and/or shown by the present disclosure but is not limited to such.

Figure 5:
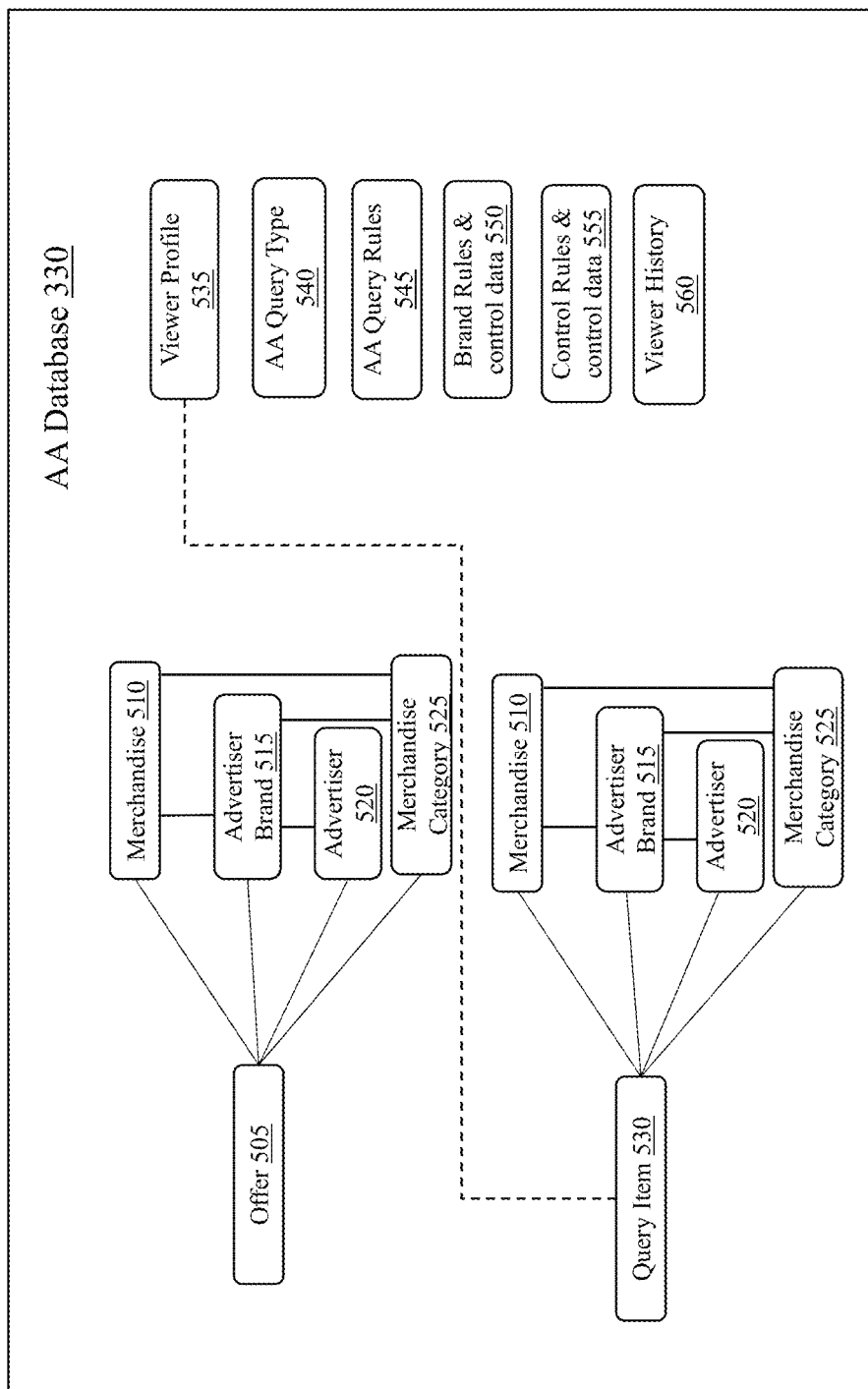
FIG. 5 is a diagram showing components of an alternative ad database according to an embodiment.

FIG. 5 is a diagram showing components of an AA database according to an embodiment. In FIG. 5, AA database 330 may include multiple sets of inter-related data such as AA offer 505, merchandise 510, advertiser brand 515, advertiser 520 and merchandise category 525. AA offer 505 may be an advertising message sent in response to an AA query. The AA offer 505 may have associated text, clickable URL links and associated artwork such as one or more bitmap images. The AA offer 505 may provide a discount on products or services, provide information, represent a call-to-action requesting the viewer to do something within a time interval, or request the viewer to click on one or more links. The AA offer 505 usually applies to a specific advertiser 520, one or more advertiser brands 515, specific merchandise 510 and/or a merchandise category 525. An advertiser 520 may own or represent one or more advertising brands 515. For example, Procter and Gamble® owns many detergent brands including Tide, Persil, Gain and All. Other advertisers may represent a single brand. An advertiser might wish, for example, to provide an AA offer that gives a viewer a ten percent discount on a) any merchandise from the advertiser; b) any merchandise associated with one or more specific brands; c) specific merchandise or merchandise category. Each advertiser has merchandise that they wish to promote. The merchandise 510 can be any goods or service from that advertiser. For example, merchandise 510 could be "Meineke's brake or oil change service", or "Windex®". The advertiser 520 can group merchandise 510 together into named merchandise categories 525. An advertiser 520 can request the AA system to create an AA query asking about their specific merchandise and merchandise categories defined in the AA database.

AA offer 505, merchandise 510, advertiser brand 515, advertiser 520 and merchandise category 525 have related attributes such as AA offer-locations, seasonality, and rules. For example, the advertiser might want to restrict AA offers 505 to viewers in the United States, or only make certain AA offers during the Christmas sales period. In many cases, the advertiser wants to specify a single value that applies to all related AA offers 505, merchandise 510, advertiser brands 515, and merchandise categories 525. In other cases, the advertiser may want to specify different values for different AA offers 505, merchandise 510, advertiser brands 515, and merchandise categories 525. In one embodiment, the AA system provides attribute value inheritance so that merchandise 510 can assume attribute values from parent advertiser 520.

The AA system creates AA queries asking the viewer to show a preference between generic merchandise categories (e.g., any detergent or any snack food) that encompass merchandise from multiple advertisers. For this reason, the AA database maintains a list of generic merchandise categories and their associations with specific advertiser merchandise, merchandise categories and AA offers. The AA merchandise categories and merchandise are different from those found at the Amazon® web-site by being more general and including services as well as products.

The AA database 330 can be implemented in many ways. In one embodiment, the database consists of multiple different record-types that include record-types for AA offer 505, merchandise 510, advertiser brand 515, advertiser 520 and merchandise category 525. Each record has fields or attributes with values. Each record can be considered an object. The relationships can be stored in three-valued records of the form "<object1><relationship><object2>". The <relationship> field has values such as "is-an-AA offer-for", "is-a-member-of", "is-a-parent-of".

An AA query item 530 is an object that appears in an AA query. When a viewer selects AA query item 530, the viewer usually indicates a preference for that object. Each AA query item 530 has associated display text and/or artwork. Each AA query item 530 refers to another object in the database including a specific advertiser 520, an advertiser brand 515, specific merchandise 510, a category of merchandise 525 or an attribute in viewer profile 535. In one embodiment, the AA database 330 includes AA query item records. In another embodiment, the AA system derives the AA query items from other record-types having a field indicating if the record represents an AA query item. AA query items can indicate a viewer's preference or can be used for purely informational purposes. AA query items have a scoreable attribute to indicate if the AA query item indicates a viewer's preference.

The viewer profile 535 contains known information about a viewer. The viewer profile 535 includes fields for sign-in credentials, email address, age, gender, location, reward status and preferences.

An AA query type 540 gives information about a possible AA query type. The AA system displays an AA query as a screen overlays on some viewer devices (e.g., a smartphone) and as windows on other viewer devices (e.g., a desktop computer). AA query types include: a) a single-screen/window AA query where the viewer selects N brands from M choices, b) a single-screen/window AA query where the viewer selects N generic merchandise categories from M choices, c) a single-screen/window AA query where the viewer selects N advertiser-specific or brand-specific merchandise categories from M choices, d) a two-screen/window AA query where the viewer selects N brands from M choices on a first screen/window and then picks P merchandise categories from Q choices (related to the N selections) on a second screen/window, e) a special AA query designed to determine the viewer's gender, f) a special question that asks the viewer select a gender and an age-range.

AA query rules 545 control the AA server's selection of AA query type and AA query items to send to the viewer.

Brand rules and control data 550 allow an advertiser or brand manager to control what AA offers they send or when to show their brand, merchandise and merchandise category in an AA query. As an example, for a first AA query type above, where the viewer selects among competing brands, the brands are in competition to be shown as choices. The advertiser can specify a bid, such as 20 cents, and specify a maximum budget. The advertiser can further refine this bid so as to bid different amounts depending on the viewer's demographics such as age and/or gender. For a second AA query type above, where the viewer selects among generic merchandise categories, the brands are in competition in two ways. Each advertiser wants his or her merchandise categories shown as a choice. After the viewer has selected a generic merchandise category, the AA system may need to decide which advertisers get to send an AA offer. The advertiser can specify separate bid amounts for a) to have their merchandise category shown as a choice, and b) to be selected as the advertiser to send the AA offer.

Control data can be expressed in multiple ways including global variable values, parameter values, rules and object attributes. An AA system operator can change control data to change the AA system behavior. In one embodiment, the global variables include:

The length of time that a viewer can watch an episode advert-free.

The number of times to repeat sending the same AA offer.

The number of consecutive times a viewer has to enter "No I want commercials" to AA queries before giving the viewer opt-out information.

The number of consecutive times a viewer enters "No I want commercials" before the AA system changes the AA query header and sub-header.

The number of consecutive times a viewer fails to open an AA offer email before giving the viewer opt-out information.

Attributes of each AA query type object control the format and behavior of AA queries of the corresponding type. AA query type objects include:

The number of items that the viewer can select.

The number of items to rank.

The number of levels of screens/windows.

The information contained in AA query rules, brand rules, control rules and control data can be entered, displayed and stored in many ways. In an embodiment, the rules are of the form "if"<condition>"then"<action>. The <condition> component can use conjunctions and disjunctions of basic conditions. Basic conditions include checking if an AA query item was selected, comparing counts of events, and testing viewer attributes. Basic conditions refer to objects and object attributes. The AA system defines global objects, such as the current viewer, current AA offer or current AA query selections, that the rule can reference. For example, a rule may include "current-viewer-> location" to refer to the current viewer's location. The AA system uses in-built functions in the same way that a spreadsheet uses in-built functions in its formulae. The AA system may make multiple simultaneous AA offers or have multiple selected AA query items. The rules allow embedded functions to decide if the rules apply separately to each item, or apply if any or all items meet some condition. The <action> component includes actions such as displaying or not displaying an AA query item, making or not making an AA offer, changing a bid, or selecting an AA query-type.

Examples of brand rules include:

If the viewer picks merchandise category trucks, then do not make a bid.

If a specific AA offer has been sent a specific amount of time (e.g., 500 times) then do not display associated AA query items.

If the viewer is outside the U.S. then do not send any AA offers.

If a viewer's second choice matches the advertiser's AA query items, make a bid for it.

If the viewer is male and in a certain age group (e.g., 30-55 years old), then bid an extra amount (e.g., 50% more).

Control rules and control data 555 control the overall operation of the AA server. Examples of control rules include:

If the viewer replies NO to an AA query for a specific number of times (e.g., 8 consecutive times), then play content with adverts.

If the viewer has not opened a specific number of previous AA offers (e.g., last 20 AA offers), then play content with adverts.

If the viewer has replied YES to AA queries for a specific number of times (e.g., 10 times), then ask a viewer profile question.

If the viewer has received the same AA offer for a specific number of times (e.g., 3 times), then do not send the AA offer again.

If the viewer has previously selected from a low quantity of selectable items (e.g., <10% of all selectable items), then construct an AA query showing 50% high system-equity query items and 50% random query items.

If the viewer has opened an AA offer email within a previous number of days (e.g., last 60 days), then do not show the AA query item associated with that AA offer.

If the viewer has not clicked on a particular brand after certain consecutive showings (e.g., 5 consecutive showings), then do not show the that brand.

Viewer history 560 includes record of all viewer selections and preferences.

Figure 6:
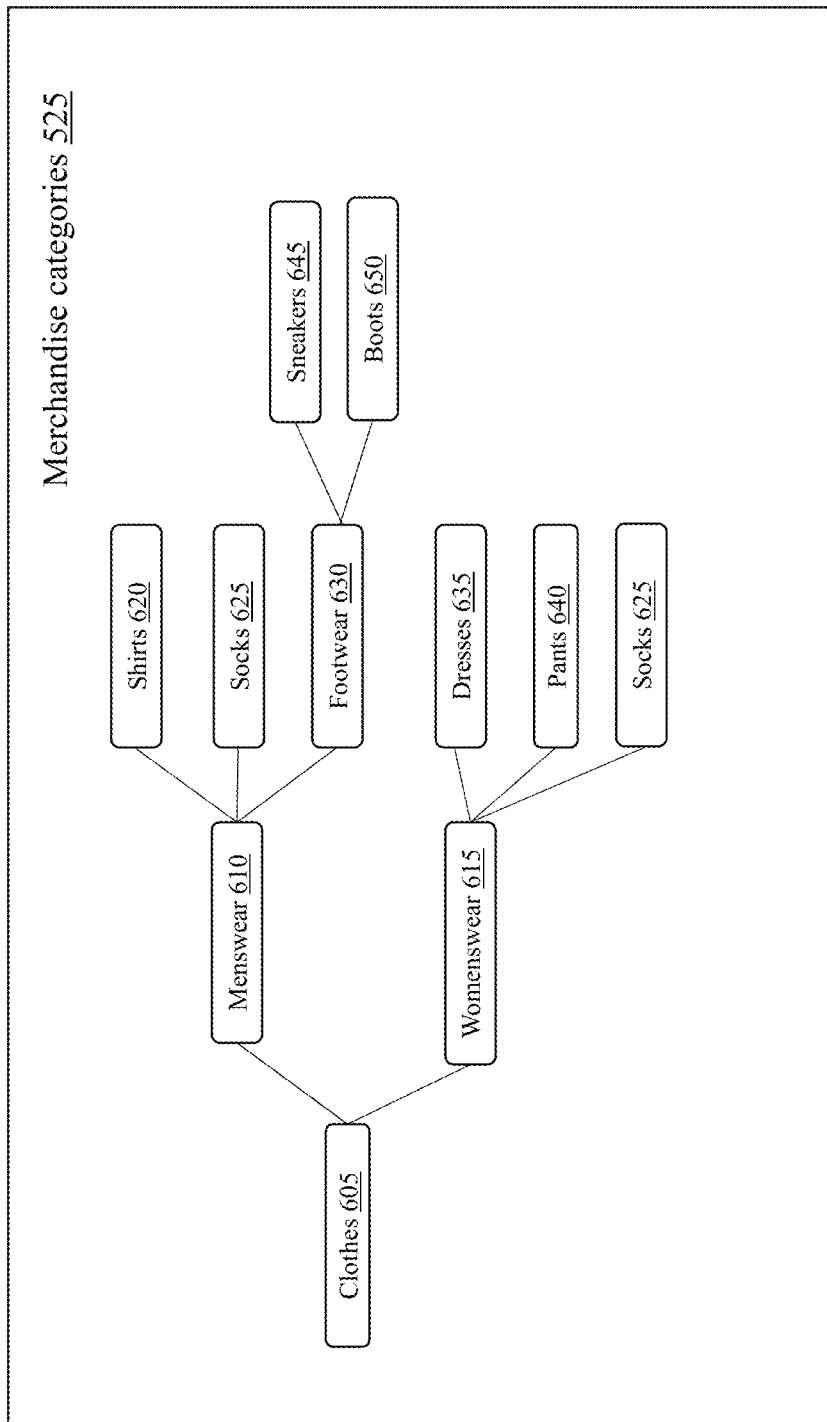
FIG. 6 is a diagram showing examples of merchandise categories according to an embodiment.

FIG. 6 is a diagram showing examples of merchandise categories. In FIG. 6, merchandise categories 525 may include merchandise category clothes 605 having links to more specific merchandise categories menswear 610 and womenswear 615. Merchandise category menswear 610 has links to more specific merchandise categories shirts 620, socks 625 and footwear 630. Merchandise category womenswear 615 has links to more specific merchandise categories dresses 635, socks 625 and pants 640. Merchandise category footwear 630 has links to more specific merchandise categories sneakers 645 and boots 650. The merchandise category socks 625 can be a specialization of both menswear 610 and womenswear 615. The AA system uses the hierarchy of merchandise categories in several ways. Firstly, the AA system uses the merchandise category hierarchy to construct queries to discovering more specific preferences of a viewer. Secondly, the AA system uses the merchandise category hierarchy to match advertiser merchandise to viewer merchandise category preferences. For example, the viewer may indicate an interest, or preference, for footwear. The AA system can determine that an advertiser who promotes boots may be of interest to the viewer.

Figure 7:
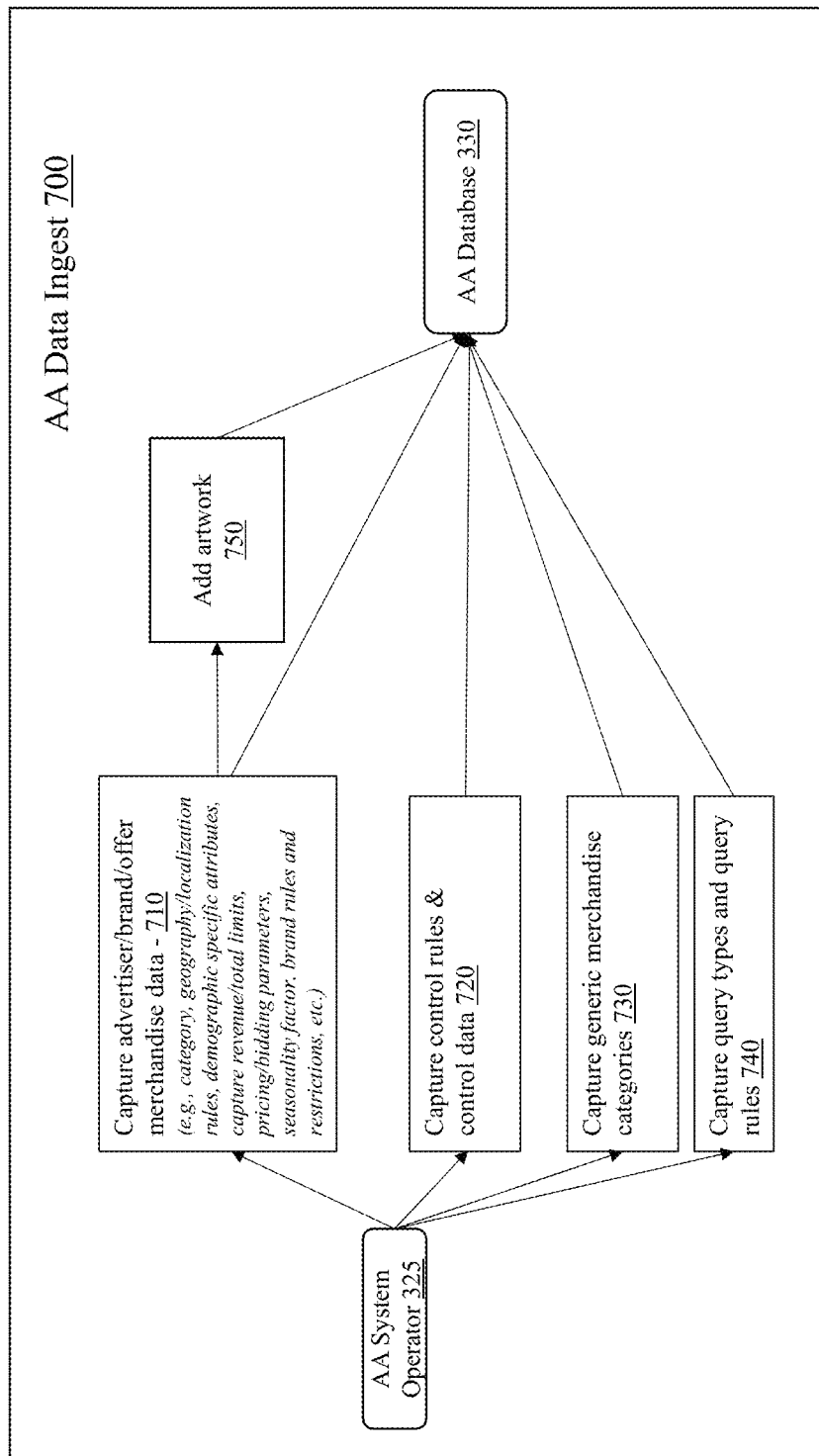
FIG. 7 is a diagram showing examples of alternative ad data ingest according to an embodiment.

FIG. 7 is a diagram showing examples of AA data ingest according to an embodiment. Referring to FIG. 7, AA data ingest 700 may begin with AA system operator 325 entering data to be stored in AA database 330. In operation 710, the AA system operator 325 may capture advertiser, brand, AA offer and merchandise data. The AA system operator 325 may enter fields such as: a) the merchandise categories supported by the advertiser, brand, AA offers and merchandise, b) geographic details such as country and region of applicability; demographics such as age-range and gender, c) maximum and minimum revenue related limits, d) pricing and bidding parameters, e) seasonality such as holiday, time/day of year association, f) brand control rules. In operation 750, the AA system operator 325 may enter or create artwork for associated AA query items and AA offers. In operation 720, the AA system operator 325 may enter or update control rules and associated control data. In operation 730, the AA system operator 325 may enter or update generic merchandise categories to be consistent with the advertiser/brand merchandise categories. In operation 740, the AA system operator 325 may enter or update AA query types and AA query rules.

Figure 8:
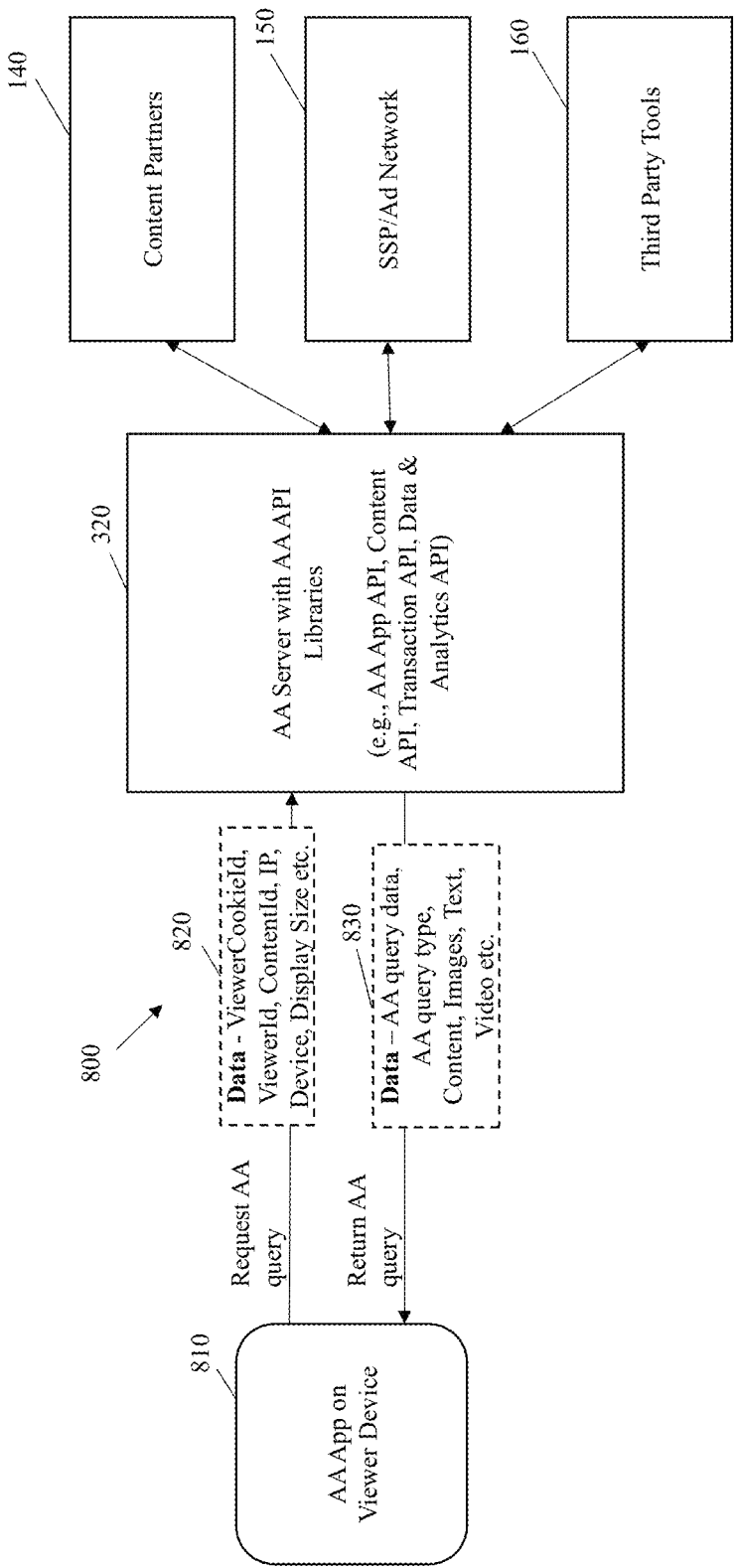
FIG. 8 is a diagram showing the use of an alternative ad system application programming interfaces (APIs) according to an embodiment.

FIG. 8 is a diagram showing the use of AA system application programming interfaces (APIs) according to an embodiment. In FIG. 8, AA server 320 may include multiple application programming interface (API) libraries used for communication with AA app 810 running on a viewer device (e.g., viewer device 310 of FIG. 3), content partners 140, SSP/Ad network 150, and third-party tools 160. API libraries may include: an AA app API, a content API, a transaction API, and a data & analytics API.

The AA app 810 may send an AA query request 820 for an AA query. The AA query request 820 may include procedure parameters to identify the viewer, the requested content and capabilities of the viewer device. If the viewer device supports cookies, the AA system stores a viewer identifier on the viewer device. If the viewer has signed in on the viewer device, the AA app 810 may have a viewer identifier associated with the sign-in, such as a viewer email address. The AA query request 820 may include the sign-in viewer identifier and the cookie viewer identifier. If an identifier is unknown, the procedure parameter may have a value indicating that it is unknown such as a NULL value. In an embodiment, AA query request 820 includes a content identifier that identifies the requested video content. The AA query request 820 includes the type of viewer device or a structure providing the viewer device capabilities. Common viewer device types have standard display sizes. The AA server 320 receives the AA query request 820 and responds by sending an AA query result 830. The AA query result 830 may identify the AA query type, AA query items, and associated display artwork or video.

Figure 9:
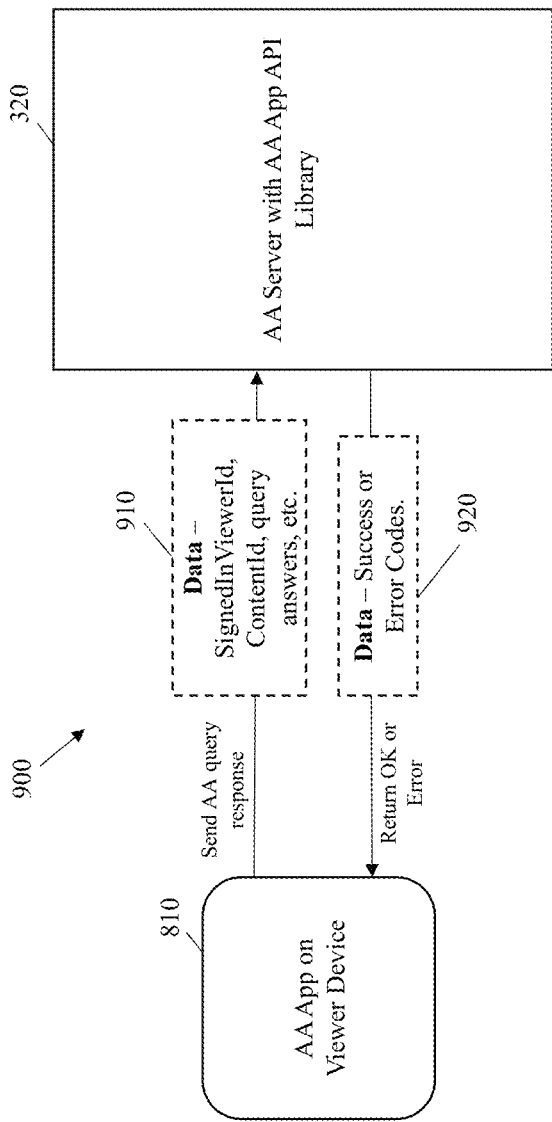
FIG. 9 is a diagram showing example alternative ad system returning values from an API call according to an embodiment.

FIG. 9 is a diagram showing example AA system returning values from an API call according to an embodiment. In FIG. 9, AA app 810 may send AA query response (or answers) 910 to AA server 320. The AA query response 910 may include a sign-in viewer identifier, a cookie viewer identifier, an answer to whether the viewer wants to watch the content advert-free, and the AA query item selections. After receiving the AA query response 910, AA server 320 may send a return code 920 indicating success or failure to AA app 810.

The Viewer Interface

Figure 10:
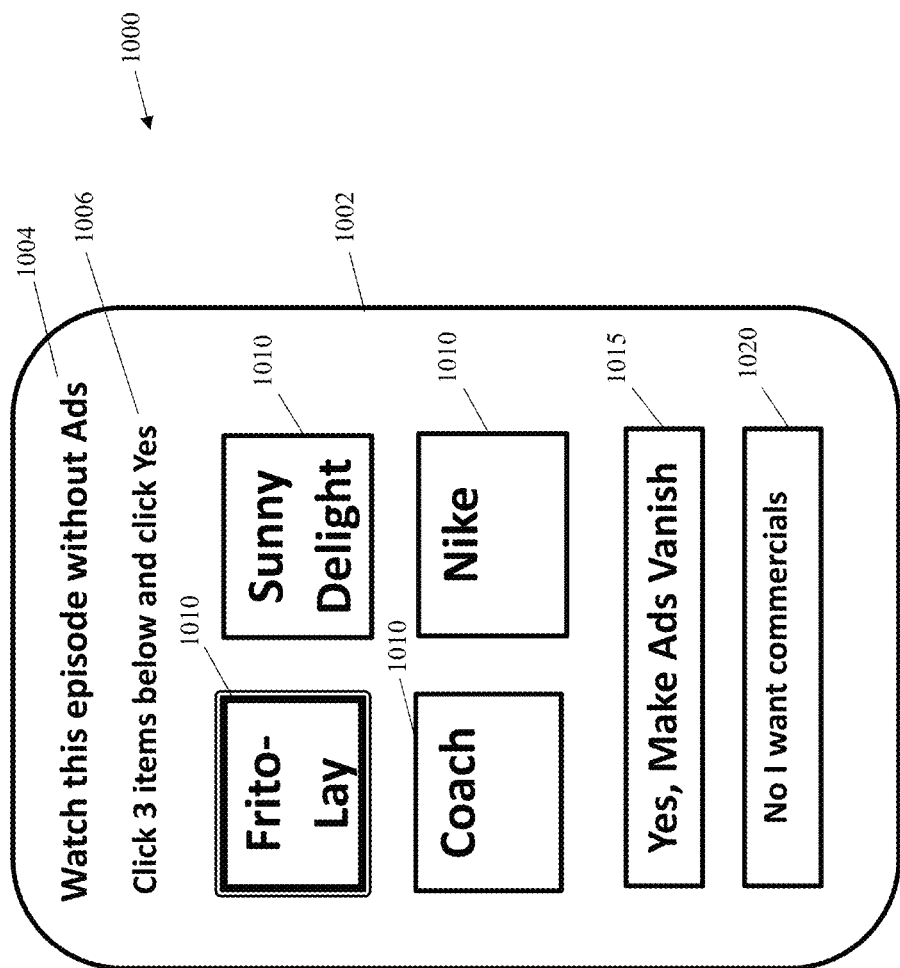
FIG. 10 is a diagram showing an example alternative ad query on a display of a viewer device according to an embodiment.

FIG. 10 is a diagram showing an example AA query on a display of viewer device according to an embodiment. In an embodiment, AA query 1000 summarizes the purpose of the AA query, gives the viewer clear instructions what to do, presents selectable items and has two buttons for accepting or rejecting an AA offer to watch advert-free content. The AA query may encourage the viewer to select the advert-free option, is easy to understand and quick to complete. As shown in FIG. 10, AA query 1000 includes a heading 1004 (e.g., "Watch this episode without Ads"). Heading 1004 summarizes the purpose of the AA query 1000 and encourages the viewer to select and watch advert-free video content. For example, if the viewer has requested a movie or other video content without episodes, the AA query 1000 may replace the word "episode" appropriately. In one embodiment, the heading 1004 has a larger font size than other screen text. The AA query 1000 may also include a sub-header 1006 (e.g., "Click <N> items below and click Yes") where <N> is an integer greater than 0. Sub-header 1006 may provide an explanation of what the viewer should do and encourage the viewer to select button 1015. The AA query items 1010 may show brands, merchandise categories or merchandise. In this example, the AA query 1000 has four AA query items 1010 showing different brands (e.g., Frito-Lay®, Sunny Delight®, Coach®, and Nike®). The AA query items 1010 may include associated artwork, such as an image. The number of AA query items 1010 varies and depends on the capabilities of the viewer device display. In an embodiment, the number of AA query items 1010 may be four, six, nine or sixteen. The AA query has two buttons 1015 and 1020. In this example, button 1015 is labeled "Yes, Make Ads Vanish" and button 1020 is labeled "No I want commercials". In one embodiment, button 1015 uses a larger font than button 1020 to further encourage the viewer to select it. The AA system periodically changes the text and format of header 1004, sub-header 1006 and the buttons 1015 and 1020. For example, if a viewer has selected the "No I want commercials" button 1020 ten consecutive times, the AA system may change the relative sizes of the two buttons 1015 and 1020 and change the heading. The AA system operator may set system control parameters and specifies rules for periodically changing the AA query.

The VOD publisher may want the viewer to select the appropriate number of AA query items 1010 and then click button 1015. Selecting an AA query item 1010 may cause the AA system to highlight that AA query item 1010 and generate a distinctive auditory tone or sound. The auditory tones or sounds can provide a video-game-like experience. The viewer selections may generate a series of auditory tones or sounds that form a familiar tune. The AA system uses an AA tone and sound library that lists the possible audio tones and sounds. The AA system operator sets system control parameters and specifies rules for assigning audible tones and sounds to selectable buttons and AA query items. Selecting an AA query item 1010 a second time cancels the selection and causes the AA system to un-highlight that AA query item 1010. The AA system may highlight AA query item 1010 in multiple ways including a) using the standard or most common button highlighting method on the viewer device operating system, b) making the AA query item 1010 appear depressed by adding a shadow, c) increasing the width of the AA query item 1010 border, d) drawing an extra box around AA query item 1010, and e) changing an image displayed within AA query item 1010, e.g., by changing from color to black and white. If the viewer selects the appropriate number of AA query items 1010 and then clicks button 1015, the AA system replaces the displayed AA query with the sign-in/sign-up display, if needed, and then shows the selected video content. In an embodiment, if the viewer selects the wrong number of AA query items 1010 and then clicks button 1015, the AA system indicates an error and continues to display the AA query. The AA system can signal an error in multiple ways including: a) making an error sound, b) flashing the screen, c) displaying a message explaining that the viewer has selected the wrong number of AA query items. If the viewer clicks button 1020, the AA system replaces the displayed AA query with the selected video content.

Figure 11:
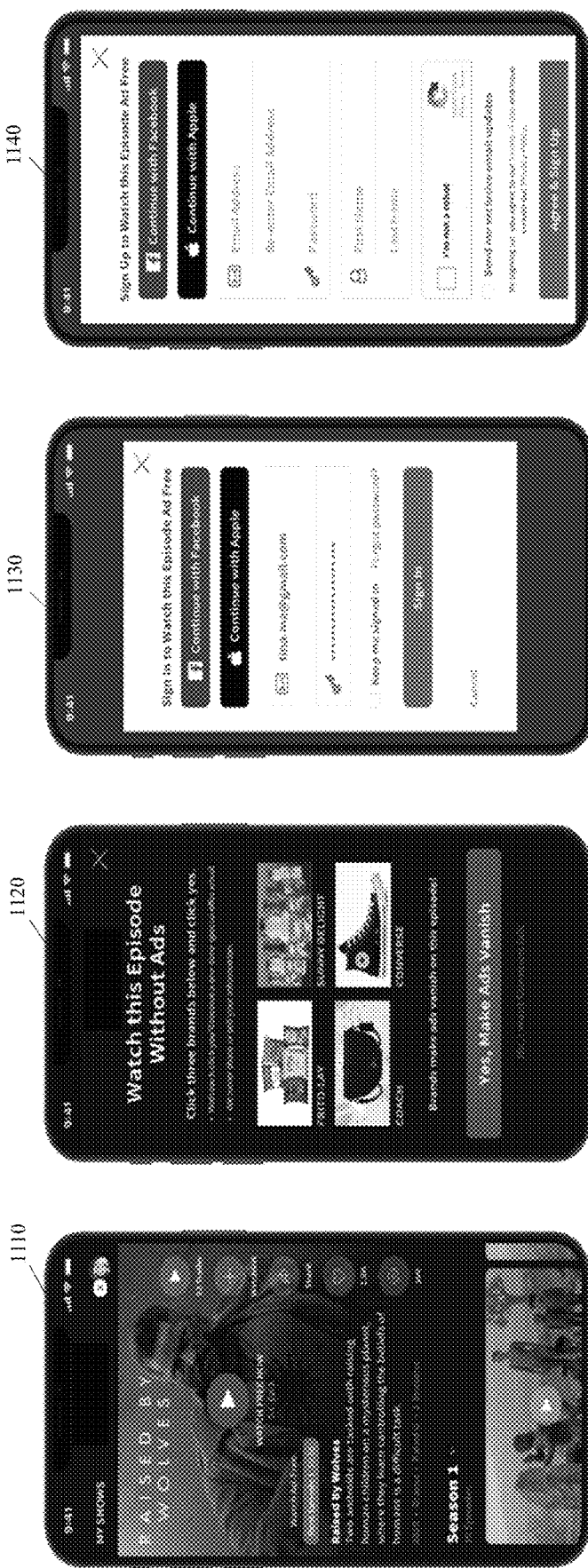
FIG. 11 is a diagram showing example viewer device screenshots from the alternative ad application according to an embodiment.

FIG. 11 is a diagram showing four example viewer device screenshots from an AA app according to an embodiment. In FIG. 11, screenshot 1110 shows the title, summary, and related artwork for video content selected by the viewer. In this example, the viewer has selected a television show with title "Raised by Wolves". Screenshot 1110 also shows a button for playing the video content for free. In response to the viewer selecting this "WATCH FREE NOW" button, the AA system displays the AA query in screenshot 1120. In response to the viewer selecting the appropriate number of brands and clicking the "Yes, Make Ads Vanish" button, the AA system may display the information in either screenshot 1130 or screenshot 1140. If the viewer has already signed in, the AA system has no need to show screenshot 1130 or screenshot 1140. If the viewer has an existing account and has not yet signed in, the AA system displays the information in screenshot 1130. If the viewer does not have an existing account, AA system displays the information in screenshot 1140. Screenshot 1130 provides an easy-to-use, normally single-click sign-in screen with the viewer's name and password filled in. Screenshot 1140 provides an easy-to-use, registration screen allowing the viewer to sign-in with an existing account, such as Facebook, or specify an email address and password.

Figure 12:
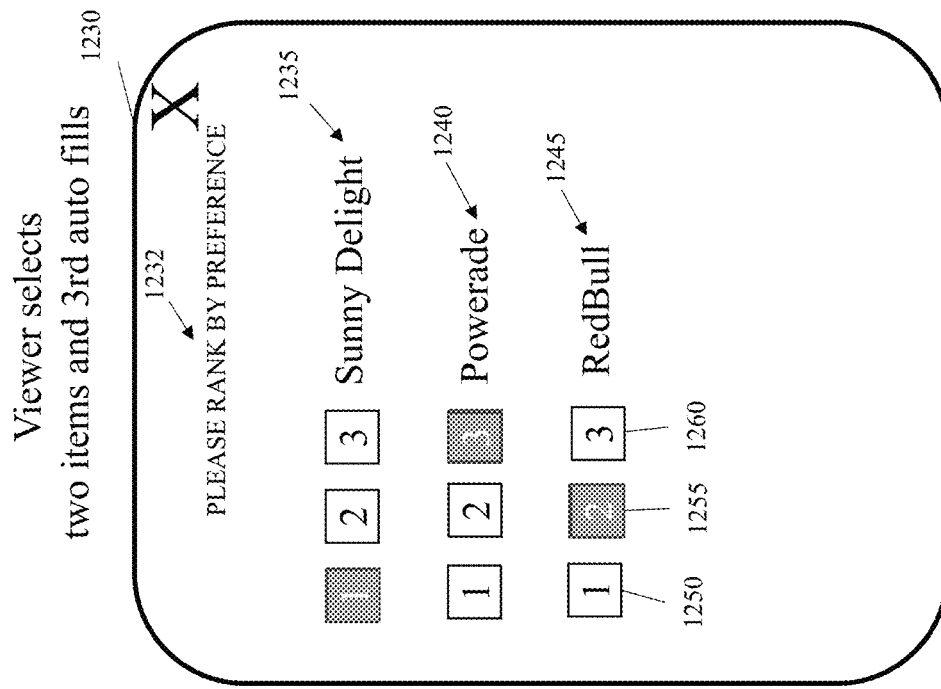
FIG. 12 is a diagram showing an example two-level alternative ad ranking survey according to an embodiment.
Figure 12:
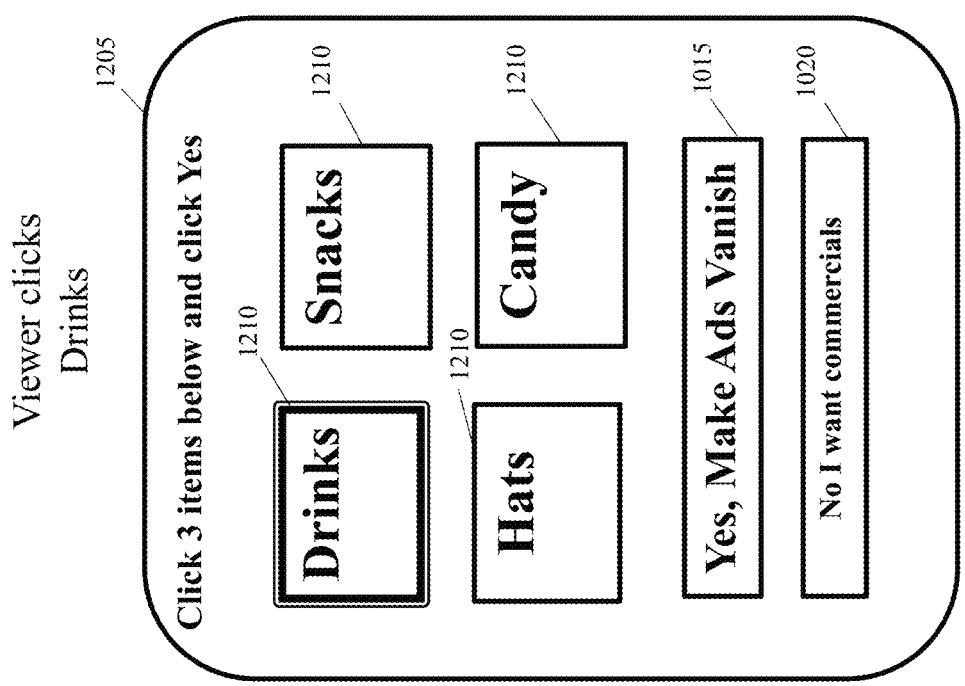

FIG. 12 is a diagram showing an example two-level AA ranking survey according to an embodiment. In FIG. 12, the AA system may first display first-level screen/window 1205 and later displays second-level screen/window 1230. First-level screen/window 1205 displays an AA query on a viewer device. The screen/window 1205 shows four merchandise category items 1210, a "Yes, Make Ads Vanish" button 1015 and a "No I want commercials" button 1020. When a viewer selects a merchandise category item 1210, the AA system immediately displays the information shown in second-level screen/window 1230. In this example, the viewer selects the merchandise category item 1210 for drinks, and the AA system responds by showing three types of drinks, e.g., Sunny Delight 1235, Powerade 1240 and Red Bull 1245 in screen/window 1230. Screen/window 1230 displays instructional text 1232, ranked AA query items 1235, 1240 and 1245, and associated ranking boxes 1250, 1255, 1260. Each ranked AA query item has its own associated ranking boxes.

In a first configuration, the viewer selects either a ranked AA query item or any of its associated ranking boxes to indicate a preference. The first such selection may cause the AA system to check or highlight the first ranking box 1250 to indicate the that AA query item is the highest-ranked item and play an audible tone (or sound). The second AA query item selection may cause the AA system to check or highlight the second ranking box 1255, to indicate the second highest-ranked AA query item, and play a second audible tone (or sound). After the viewer has made two selections, the AA system may automatically fill in the appropriate third ranking box 1260 and plays a third audible tone (or sound), pauses for the viewer to see the final rankings and then closes the window (or reverts to the previous screen display). A viewer can change his or her highest-ranked selection by selecting the same AA query item selection a second time. Selecting the same AA query item selection twice cancels the selection.

In a second configuration, the viewer selects ranking boxes 1250, 1255 and 1260 to indicate first, second and third choice. The AA system uses this configuration when the ranking boxes 1250, 1255 and 1260 are sufficiently large for the viewer to be able to easily select them. The AA system operator controls whether the AA system uses the first or second configuration, or if the AA system automatically selects the configuration based on the viewer device capabilities. After the viewer makes two rankings, the AA system may fill in the third ranking box appropriately, pause for the viewer to see the final rankings and then close the window (or revert to the previous screen display) automatically. A viewer can change his or her rankings by clicking on different ranking boxes 1250, 1255 and 1260. The AA system revises the rankings as needed to ensure there is one first-choice, one second choice and one third choice. For example, if the viewer selects the first-choice ranking box 1250 for Sunny Delight 1235 and then selects the first-choice ranking box 1250 for Powerade 1240, the AA system may either change the Sunny Delight ranking from first to second or make the Sunny Delight ranking unknown.

After the viewer has completed ranking the items in screen/window 1230, the AA system may re-display the information in screen/window 1205. In this example, the viewer has completed ranking items associated with merchandise category drinks 1210. The AA system modifies the drinks 1210 AA query item display to indicate completion using methods such as a) turning the item display image from color to black-and-white, b) giving the item display a shadow to simulate depression of a button, c) darkening or blurring the item's display image.

After the viewer selects the appropriate number of items in screen/window 1205 and ranks each of their associated items in screen/window 1232, the viewer can select the "Yes, Make Ads Vanish" button 1015.

FIG. 12 provides an example of a two-level AA ranking survey according to an embodiment. The AA system can provide many types of AA ranking surveys. The AA system can vary the number of items in first-level screen/window 1205 and can vary the number of items in second-level screen/window 1230. The AA system can vary the types of items in screen/window 1205 and can vary the types of items in screen/window 1230. In this example, the AA system shows generic merchandise categories in screen/window 1205 and shows specific brands/merchandise in screen/window 1230. Sunny Delight 1235, Powerade 1240 and Red Bull 1245 represent both a brand and merchandise. The AA system can support multi-level AA ranking surveys, where the AA system presents more than the two levels of screen/windows 1205 and 1230. More generally, the AA system can support multi-level AA queries where at each screen/window level, the screen/window asks the viewer to either select or to rank AA query items. For example, an AA query could ask a viewer to select items in a first screen/window and then select items in a subsequent screen/window.

Figure 13:
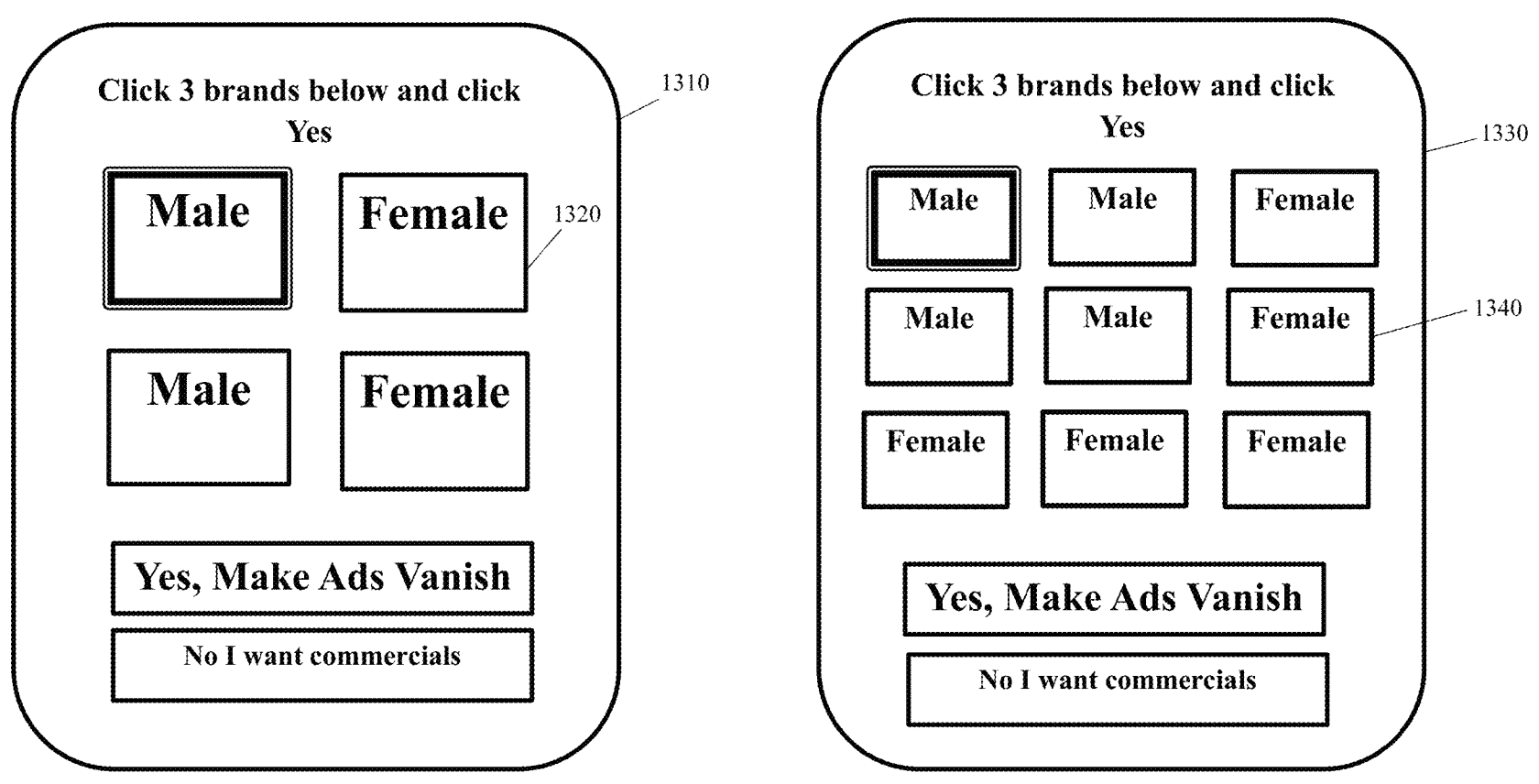

FIG. 13 is a diagram showing an example of how an AA system determines a viewer's gender or sexual orientation according to an embodiment. For example, in screen/window 1310, the AA system may display four AA query items 1320. Two of the four AA query items 1320 represent male-oriented brands, merchandise categories or merchandise and the other two AA query items 1320 represent female-oriented brands, merchandise categories or merchandise. Male-oriented brands include, for example Playboy®, Sports Illustrated®, Castrol®, Samuel Adams®, etc. Female-oriented brands include for example Revlon®, L'Oreal®, Vogue®, Sephora®, Oprah®, etc. If a viewer consistently selects AA query items associated with one gender, the AA system concludes that viewer's gender. For example, if a viewer selects female-oriented brands, merchandise categories or merchandise with more than twice the frequency the viewer selects male-oriented brands, merchandise categories or merchandise the SS system may conclude that the viewer is female. In screen/window 1330, the AA system may display AA query items 1340. Four of the nine AA query items 1320 represent male-oriented brands, merchandise categories or merchandise and the other five AA query items 1320 represent female-oriented brands, merchandise categories or merchandise. The AA system may typically display AA queries where only some of the AA query items 1320 represent male or female orientation. If the viewer selects a combination of male and female query items, then the AA system denotes the viewer's gender as undetermined.

FIG. 14 is a diagram showing an example of how an AA system uses AA query item positioning according to an embodiment. Referring to FIG. 14, grids 1410 and 1450 give examples of different AA query item positioning configurations. Grid 1410, for example, has three rows and two columns forming a 3×2 matrix. On the top row of the grid 1410, the AA system has high score AA query items 1415. On the middle row of the grid 1410, the AA system has medium score AA query items 1420. On the bottom row of the grid 1410, the AA system has low score AA query items 1425. Most viewers tend to look at the AA query items in the top row first and select the items in the top row first. The AA system uses knowledge of this positional preference when assigning AA query items to different grid locations. The AA system can place AA query items with a higher score in the most popular positions as shown in this example. The AA system may monitor viewer selections across many AA queries and determine the most popular grid locations or positions. Positional preferences vary across cultures and are influenced by factors such as whether a viewer reads from left-to-right or top-to-bottom. Individual viewers also exhibit different positional preferences so the AA system tries to detect each viewer's preferred grid positions. The AA system constructs experiments where it repeats the same AA query items in different positions. The AA system also keeps track of the order of selections. For example, in the case where a viewer selects three items, the viewer may frequently select the first item from a higher row than the second item. The AA system uses different methods of scoring. The AA system assigns higher scores to the items that a viewer prefers or is likely to prefer. The viewer may frequently see his or her preferred items first. The AA system may assign the highest scores to items that are likely to generate the most revenue for the VOD publisher.

With continued reference to FIG. 14, grid 1450 may show different types of AA query items assigned to different positions. The AA system constructs queries that include high-score AA query items 1415, gender-biased AA query items 1460 and pseudo-random AA query items 1455. For example, the AA system may show some female-oriented brands to a female viewer because the viewer likes or may like them. Alternatively, the AA system may show a male-oriented brand and a female-oriented brand to determine the viewer's gender or sexual orientation. In separate AA queries, the AA system shows the same male and female oriented brands in swapped positions to check positional bias. The AA system assigns pseudo-random AA query items to AA queries to find new viewer preferences and to validate existing viewer preferences. When a new brand is added to the AA database (e.g., AA database 330 of FIG. 5), the AA system has little or no information about viewer preferences for this brand. To better understand viewer preferences for new brands, and merchandise, the AA system includes the brand/merchandise as a pseudo-random AA query item. The AA system swaps grid locations of pseudo-random AA query items 1455 to check for positional bias. If a viewer consistently makes selections in the same grid location, regardless of the content at that grid location, the AA system concludes that the viewer is not paying attention and is not using the AA system as intended. The AA system may ask this viewer to take corrective action.

AA Query Determination

Most viewers watch multiple video content shows and receive many AA queries. The AA system may generate many different AA queries and want to provide AA query variety to each viewer. For example, the AA system avoids showing the same AA query during a viewing session. The AA system employs different AA query generation tactics depending on how much it knows about a viewer's preferences. The AA system also uses multiple scoring metrics when generating AA queries. The AA system uses an equity score to measure the overall popularity and revenue-generation of an AA query item such as a specific brand, merchandise category or merchandise. The AA system also uses a viewer-item affinity score to estimate a specific viewer's attitude towards a specific AA query item. Tables 1, 2 and 3 (herein below) show scoring metrics and how the AA system derives them.

Figure 15:
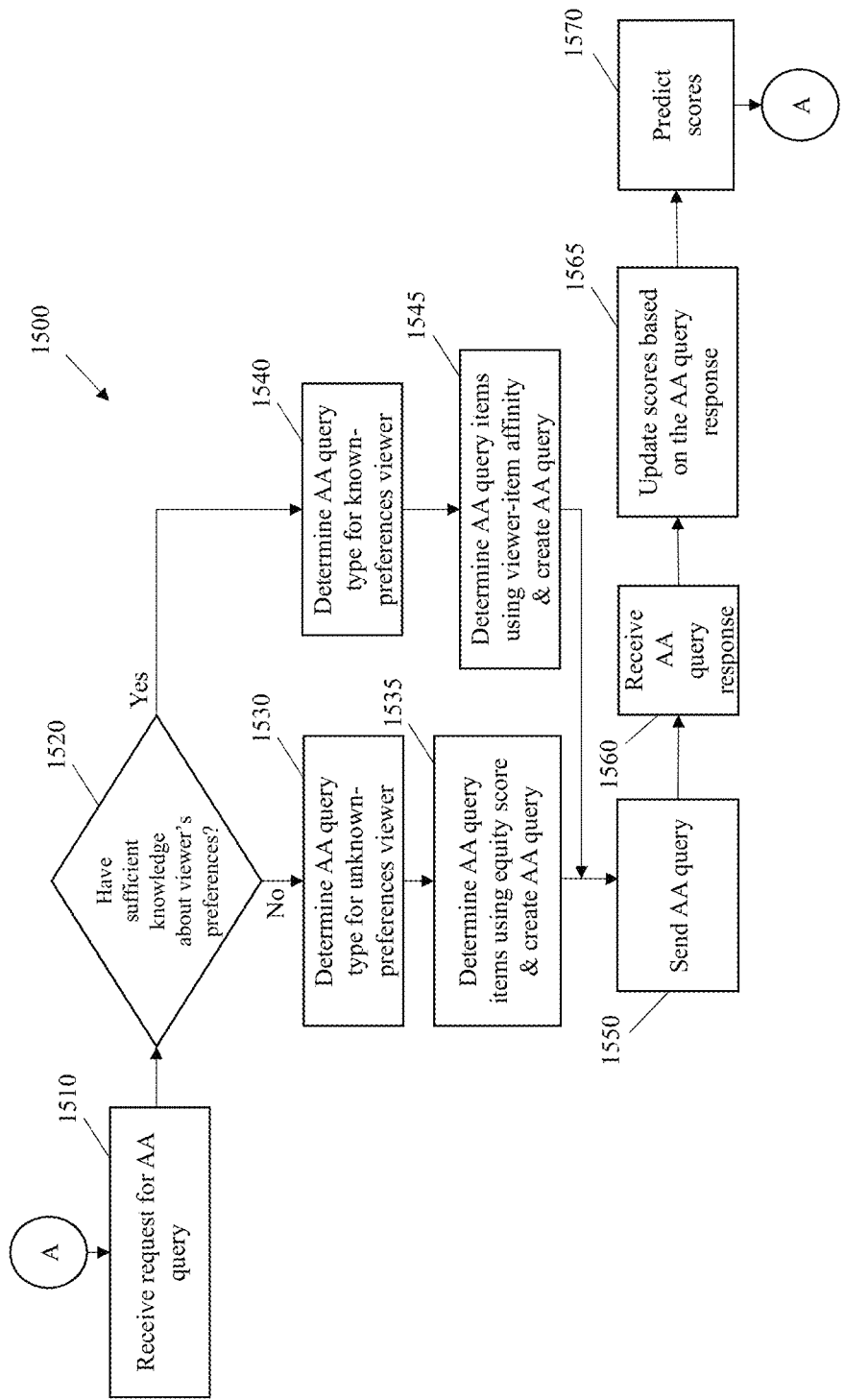
FIG. 15 is a flowchart showing an example process of how the alternative ad system determines the next alternative ad query according to an embodiment.

FIG. 15 is a flowchart showing an example process of how an AA system determines a next AA query according to an embodiment. Process 1500 may be performed by processing logic that includes hardware (e.g. circuitry, dedicated logic, etc.), software (e.g., embodied on a non-transitory computer readable medium), or a combination thereof. For example, process 1500 may be performed by AA system 300 of FIG. 3. Referring to FIG. 15, in operation 1510 the AA system receives a request to generate an AA query. In operation 1520, the AA system may determine or test whether the system has sufficient knowledge about a viewer's preferences. In one embodiment, the AA system counts a number of scoreable AA query items for which the viewer has a known or derived preference and divides the number of scoreable AA query items by a total number of scoreable AA query items. The AA system may compare this result to a threshold value, such as 40%. The AA system operator can adjust the threshold value. If the percentage of known scoreable AA query items exceeds the threshold value, the AA system determines that there is sufficient knowledge about the viewer's preferences and proceeds to operation 1540. If the percentage of known scoreable AA query items does not exceed the threshold, the AA system determines that there is insufficient knowledge about the viewer's preferences and proceeds to operation 1530. In a system with new brands, merchandise categories and new merchandise, the AA system may know little about a viewer's preferences and follow the same procedure. In operation 1530, the AA system determines what type of AA query to create for the viewer with unknown preferences. For example, the AA system may decide between AA query types, such as a two-level AA ranking survey or a one-level AA selection query. The AA system may favor using the two-level AA ranking survey when it has little information about a new viewers' preferences, as the two-level AA ranking survey gives more information. In an embodiment, the AA system constructs AA queries asking the viewer to select or rank AA query items for which the viewer has shown no preference. For the two-level AA ranking survey, the AA system may favor using the most general, generic merchandise categories at the first level. If the first-level, generic merchandise categories have sub-categories, the AA system may ask the viewer to rank related sub-categories. If the first-level generic merchandise categories do not have sub-categories, the AA system may ask the viewer to rank related brands or specific merchandise. In one embodiment, the AA system uses the information in a table to decide the sequence of AA query-types. Table 1 gives one such example.

TABLE 1

| Viewer Preference known | Sequence of AA query-types to use |
| --- | --- |
| <40% | Type-1, type-2, type-3, type-4, type-1 |
| >=40% | Type-1, type-2, type-3 |

In the example of Table 1, the AA system may cycle through a list of AA query-types on the first row if the viewer has known preferences of less than forty percent of the possible or total AA query items. The AA system may first use AA query-type "type-1". The AA system may next use AA query-type "type-2" and subsequently use each of the AA query types in the list. The AA system repeats the sequence of AA query types after it has used all the AA query-types in the appropriate table cell.

In operation 1535, the AA system determines or selects AA query items to use for a selected AA query type. The AA system may favor using demographic-revealing AA query items, and high equity scoring AA query items. The AA system may also select pseudo-random AA query items. If the AA system does not know the viewer's gender (or other demographic values), the AA system may also introduce AA queries to determine the viewer's gender. These AA queries attempt to discover new viewer-preference information and predominately use AA query items for which the viewer has shown no preference. In an embodiment, the AA system applies control rules to filter out some AA query items (e.g., do not display male-oriented merchandise to females). In one embodiment, the AA system uses a data table to indicate how many AA query items of each type to use. For example, the data table may indicate that the AA system should use a ratio of one high-equity AA query item, one demographic-determining AA query item and one pseudo-random AA query item for a one-level selection AA query. If the viewer device has a screen size that accommodates nine AA query items, the AA system can choose to assign three high-equity AA query items, three demographic-determining AA query items and three pseudo-random AA query items. The AA system selects the high-equity AA query items according to their equity score and the number of times they have been shown before.

In operation 1540, the AA system determines what type of AA query to create for the viewer with known preferences. The AA system may favor using two-level AA ranking surveys when a viewer has a strong preference for merchandise categories. In one embodiment, the AA system employs a table, for example Table 1 as shown above, to determine the next AA query-type. In operation 1545, the AA system determines the AA query items for a viewer with known preferences. The AA system may be less concerned about finding out viewer preferences and more concerned with showing AA query items that a viewer may like and may generate revenue. The AA system may favor using AA query items with a high viewer-item affinity score and only use the equity score as a tie-breaker. The AA system also uses AA query item-types with a favorable demographic attribute match and pseudo-random AA query items. In one embodiment, the AA system uses a data table to indicate how many AA query items of each type to use. For example, the data table may indicate that the AA system should use a ratio of one high viewer-item-affinity AA query item, one favorable-demographic AA query item and one pseudo-random AA query item for a one-level selection AA query.

After creating the AA query at either operation 1535, or operation 1545, the AA system proceeds to operation 1550 where the AA system sends the requested AA query. At operation 1560 the AA system receives a response (or results) to the AA query. At operation 1565, the AA system updates the equity scores and the viewer-item affinity scores based on this response. At operation 1570, the AA system may attempt to derive or predict unknown viewer-item affinity and equity scores. A system control parameter controls when the AA system attempts to predict scores.

Table 2 illustrates how the AA system assigns equity scores for an AA query item. The AA system keeps track of each viewer's responses to each AA query. In this example, the AA system keeps track of how often a viewer has seen each AA query item, how often each viewer has selected that AA query item and how much revenue that AA query item has generated. The AA system maintains multiple scoring factors by summing the data for all viewers.

TABLE 2

|  | ITEM 1 | ITEM 2 | ITEM 3 | ... | ITEM n |
|---|---|---|---|---|---|
| User 1 | Seen 7 | Seen 4 | Seen 1 | | |
|  | Selected 5 | Selected 3 | Selected 0 | | |
|  | Revenue 40 | Revenue 50 | Revenue 0 | | |
| User 2 | Seen 3 | Seen 3 | Seen 0 | | |
|  | Selected 2 | Selected 2 | Selected 0 | | |
|  | Revenue 16 | Revenue 33 | Revenue 0 | | |
| ... | | | | | |
| User n | | | ? | | |
| Totals & Equity Score factors | Seen 10 | Seen 7 | Too few seen But similar to ITEM 1 | | |
|  | Selected 7 | Selected 5 | | | |
|  | Revenue 56 | Revenue 83 | | | |
|  | Selected/ Seen Ratio 7/10 | Selected/ Seen Ratio 5/7 | | | |
|  | Revenue/ Seen Ratio 56/10 | Revenue/ Seen Ratio 83/7 | | | |

In the example of Table 2, the system keeps track of how often an AA query item has been seen, how often an AA query item has been selected, the ratio of being selected to being seen, and the total revenue. The AA system derives an equity score using a combination of these factors. In one embodiment, the AA system uses a weighted sum. In the example of Table 2, ITEM 3 has only been seen once in an AA query and so the AA system has too little information to generate an equity value as it does for the other items. The AA system can infer equity values by comparing the attributes of different AA query items. For example, if ITEM 3 belongs to the same merchandise category as ITEM 1 and ITEM 1 and ITEM 3 share other characteristics (such as a similar brand company revenue) then the AA system can infer that ITEM 3 has a similar equity score.

Table 3 illustrates a viewer-item affinity matrix. The AA system tries to determine a viewer-item affinity for every combination of viewer and AA query item. A question mark indicates an unknown affinity.

TABLE 3

|  | ITEM 1 | ITEM 2 | ITEM 3 | ... | ITEM n |
|---|---|---|---|---|---|
| Viewer 1 | 3 | 5 | ? | | 4 |
| Viewer 2 | 2 | ? | 5 | | 3 |
| ... | | | | | |
| Viewer n | ? | 4 | ? | | 2 |

In an embodiment, the AA system assigns viewer-item affinity scores based on the viewer's responses to the AA query item. The AA system may consider, for example, if the viewer accepted an AA offer related to that AA query item, if the viewer opened an AA offer related to that AA query item, if the viewer completed a selection query and selected that AA query item, if the viewer completed a ranking query and ranked that AA query item, if the viewer did not complete an AA query but selected that AA query item before clicking the "No I want commercials" button, and/or if the viewer has seen the AA query item without selecting the AA query item. In some embodiments, the AA system may consider the number of times the viewer's response occurred, for example has the viewer failed to select the AA query item in more than three AA queries. The AA system applies simple inferences and machine learning to derive unknown viewer-item affinity scores. The AA system may apply inferences between related AA query items. For example, an interest in boots implies an interest in footwear, an interest in the generic category luxury-cars implies an interest in Mercedes®, etc. The AA system may also apply inferences based on video-content selections. For example, viewers with a preference for science-fiction video content probably share a common affinity to merchandise.

Table 4 gives an example for how the AA system assigns viewer-item affinity scores. This example uses a score of 1 to 5 to indicate affinity, though any different scoring range can be used. Each viewer-item combination starts out with an unknown affinity. Scores of one to five, correspond to the viewer showing no interest (1), some interest (2), moderate interest (3), positive interest (4) and definite interest (5). The AA system could, of course use a different scoring scheme.

In an embodiment, the AA system may assign a score of one if the viewer has failed to select that AA query item or give that AA query item a better than last-place ranking when the AA query item has been shown <N> or more times (where <N> is a number). The AA system may also assign a score of one if a rule disqualifies the viewer from seeing this AA query item. For example, the viewer's demographics (e.g., age, gender and location) could be of no interest to certain advertisers. The AA system may assign a score of two if the viewer has ranked the AA query item better than last place, or selected the AA query item before clicking the "No I want commercials" button. The AA system may also assign a score of two if the AA system can derive some preference towards this AA query item. The AA system may use derived viewer-assignment scores when the viewer has not yet seen that AA query item a sufficient number of times in an AA query. Scores based on the viewer's response take priority over derived scores. The AA system may assign a score of three if the viewer has ranked the AA query item in first place in a completed AA ranking survey or if the AA system can derive moderate or better preference towards this AA query item. The AA system may assign a score of four if the viewer has selected the AA query item in a completed AA selection query. The AA system may assign a score of five if the viewer has completed an AA query, received an AA offer and opened or accepted the AA offer.

The AA system does not normally lower a known viewer-item affinity score but viewer preferences do change over time. Events such as getting married, having children, or becoming sick can cause a significant change in one's preferences. The AA system may allow a viewer to change his/her demographics and reset his/her preferences in the user profile. In one embodiment, the AA system monitors changes in the viewer preferences and gives greater priority to more recent viewer activity.

TABLE 4

| SCORE | SCORE CONDITIONS |
|---|---|
| ? | Affinity is not known or derived |
| 1 | Viewer has not shown any preference to this item. The viewer has failed to select this item or give it a positive ranking in <N> AA query showings. Or A rule disqualifies this viewer from seeing the item. |
| 2 | Viewer has shown some preference towards this item. The viewer has ranked the item better than last place. Or The viewer has selected the item but failed to complete the AA query. Or Derived affinity |
| 3 | Viewer has shown a moderate preference to the item. The viewer has ranked the item in first place and completed an AA ranking survey. Or Derived affinity |
| 4 | Viewer has shown a positive preference to the item. The viewer has selected the item and completed an AA selection query. |
| 5 | Viewer has shown a definite preference to the item. The viewer has opened or accepted the corresponding item AA offer. |

Deriving Viewer Preferences

In an embodiment, the AA system uses the well-known machine learning approaches of collaborative filtering and content-based filtering. Collaborative filtering allows the AA system to find similar viewers and content-based filtering allows the AA system to find similar AA query items. Similar viewers (or AA query items) share common characteristics. The AA system may use this similarity to predict viewer-item affinity scores. If a first AA query item has similar characteristics to a second AA query item, the AA system can use the first AA query item's viewer-item affinities to predict the second AA query item's viewer-item affinities.

Figure 16:
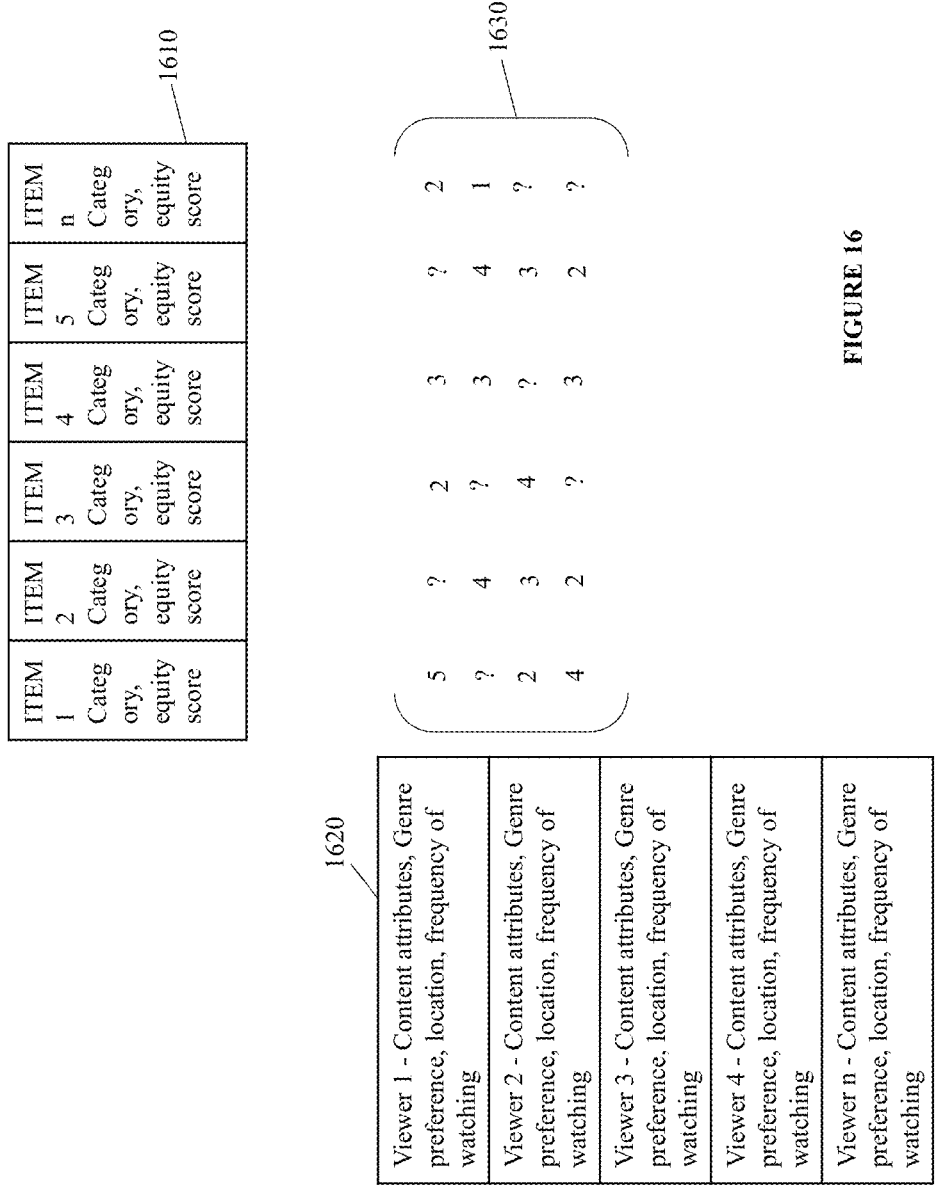
FIG. 16 is a diagram showing an example viewer-item affinity matrix according to an embodiment.

FIG. 16 is a diagram showing an example viewer-item affinity matrix. In FIG. 16, matrix columns 1610 may represent different AA query items. The matrix rows 1620 may represent different viewers. The number of viewers generally exceeds the number of AA query items. Viewer-item affinity matrix 1630 may indicate each viewer's affinity to each query item. The viewer-item affinity matrix 1630 is bi-modal because it relates two entities that each have their own attributes. Each viewer has attributes such as video-content preferences, location, frequency of watching and demographics. The AA query items have attributes such as merchandise category, revenue and equity score. To reduce the storage requirements of the viewer-item affinity matrix 1630, the AA system stores the viewer-item affinity matrix as a sparse matrix, such as a scipy sparse matrix. The AA system assigns a value of zero to unknown viewer-item affinity values. The sparse matrix encodes the large numbers of zeros to reduce the storage space.

In one embodiment, the AA system determines similarity using techniques such as Cosine similarity or L1/L2 Norm. These techniques measure the distance between AA query items (or viewers) in hyperspace. The AA system uses the K-nearest-neighbors (KNN) approach to find the <K> most similar AA query items (or viewers). The AA system replaces unknown values with values derived from the <K> nearest neighbors. The AA system may take the average viewer-item affinity from the nearest two neighbors. In the viewer-item affinity assignments described in Table 4, derived affinities have a score of either two or three. In this case, the AA system may compare the average viewer-item affinity to a threshold. The AA system may assign a value of three if that average exceeds the threshold and two if not.

In another embodiment, the AA system uses the matrix factorization technique. Matrix factorization provides a more scalable approach as the volume of data increases. Matrix factorization also reduces two limitations of the KNN approach known as the popularity bias and the cold-start problem. In a third embodiment the AA system uses Singular Value Decomposition (SVD) to decompose the matrix.

Matrix factorization algorithms work by decomposing the viewer-item affinity matrix into the product of two lower dimensionality rectangular matrices. The product of the two lower dimensionality rectangular matrices approximates the original viewer-item affinity matrix.

Figure 17:
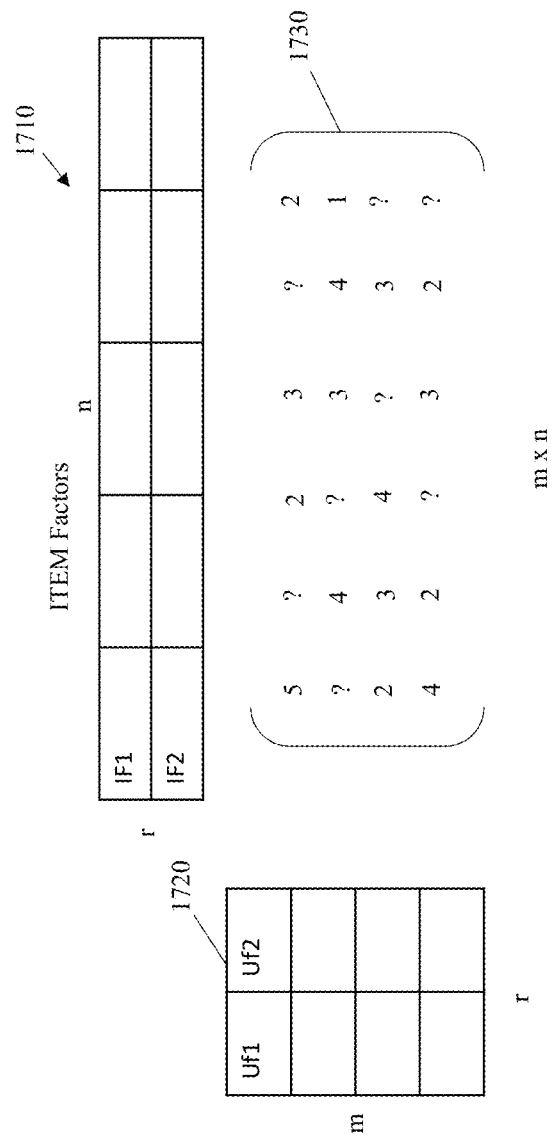
FIG. 17 is a diagram showing another example viewer-item affinity matrix according to an embodiment.

FIG. 17 is a diagram showing another example viewer-item affinity matrix according to an embodiment. In an embodiment, the AA system decomposes viewer-item affinity matrix 1730 into a viewer factors matrix 1720 and an AA query item factors matrix 1710 using low-rank matrix factorization. In this example, there are m viewers and n AA query items so the viewer-item affinity matrix 1730 has dimensions m×n. The viewer factors matrix 1720 may include r feature factors representing viewer attributes. The AA query item factors matrix 1710 may also include r feature factors representing query item attributes. The AA system finds similarity between viewers represented in the viewer factors matrix 1720, and then uses this similarity to fill in the viewer-item affinity matrix 1730. The AA system finds similarity using techniques such as Cosine similarity or mean square error (MSE).

Matrix factorization is a form of optimization process that aims to approximate the original matrix R with the two matrices U and P, such that it minimizes the following cost function:

$$J=\|R-U\times P^T\|^2+L(\|U\|2+\|P\|^2)$$

The first term in this cost function is the Mean Square Error (MSE) distance measure between the original rating matrix R and its approximation U×P$^T$. The second term, L, is called a "regularization term" and is added to govern a generalized solution (to prevent overfitting to some local noisy effects on ratings).

Gradient Descent and Alternating Least Squares (ALS) are well-known, iterative machine learning techniques for minimizing the cost function.

In one embodiment the AA system uses Spark. Spark is a new industry-standard distributed batch processing framework for general-purpose cluster computing. The machine learning library, MLlib, was built on top of Spark to take advantage of Spark's capabilities when running iterative Machine Learning algorithms.

All examples and conditional language recited herein are intended for pedagogical purposes to aid the reader in understanding the principles of the present disclosure and the concepts contributed by the inventor to furthering the art and are to be construed as being without limitation to such specifically recited examples and conditions. Moreover, all statements herein reciting principles, aspects, and embodiments of the present disclosure, as well as specific examples thereof, are intended to encompass both structural and functional equivalents thereof. Additionally, it is intended that such equivalents include both currently known equivalents as well as equivalents developed in the future, e.g., any elements developed that perform the same function, regardless of structure.

Note that some or all of the components as shown and described above may be implemented in software, hardware, or a combination thereof. For example, such components can be implemented as software installed and stored in a persistent storage device, which can be loaded and executed in a memory by a processor (not shown) to carry out the processes or operations described throughout this application. Alternatively, such components can be implemented as executable code programmed or embedded into dedicated hardware such as an integrated circuit (e.g., an application specific IC or ASIC), a digital signal processor (DSP), or a field programmable gate array (FPGA), which can be accessed via a corresponding driver and/or operating system from an application. Furthermore, such components can be implemented as specific hardware logic in a processor or processor core as part of an instruction set accessible by a software component via one or more specific instructions.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as those set forth in the claims below, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Embodiments of the disclosure also relate to an apparatus for performing the operations herein. Such a computer program is stored in a non-transitory computer readable medium. A machine-readable medium includes any mechanism for storing information in a form readable by a machine (e.g., a computer). For example, a machine-readable (e.g., computer-readable) medium includes a machine (e.g., a computer) readable storage medium (e.g., read only memory ("ROM"), random access memory ("RAM"), magnetic disk storage media, optical storage media, flash memory devices).

The processes or methods depicted in the preceding figures may be performed by processing logic that comprises hardware (e.g. circuitry, dedicated logic, etc.), software (e.g., embodied on a non-transitory computer readable medium), or a combination of both. Although the processes or methods are described above in terms of some sequential operations, it should be appreciated that some of the operations described may be performed in a different order. Moreover, some operations may be performed in parallel rather than sequentially.

Embodiments of the present disclosure are not described with reference to any particular programming language. It will be appreciated that a variety of programming languages may be used to implement the teachings of embodiments of the disclosure as described herein.

The foregoing descriptions of various specific embodiments in accordance with the present disclosure have been presented for purposes of illustration and description. They are not intended to be exhaustive or to limit the present disclosure to the precise forms disclosed, and many modifications and variations are possible in light of the above teaching. The present disclosure is to be construed according to the claims and their equivalents.

What is claimed is:

1. A computer-implemented method of providing video content, the method comprising:
receiving, by a server from a viewer device of a viewer, a request to generate an AA query and to view video content;
in response to the request, determining, by the server, whether a percentage of scoreable AA query items for which the viewer has a known or derived preference exceeds a threshold value, wherein each scoreable AA query item has an assigned equity score and an assigned viewer-item affinity score, the assigned viewer-item affinity score indicates a preference level of the viewer towards the scoreable AA query item and the assigned equity score is used to measure an overall popularity and revenue-generation of the scoreable AA query item;
in response to determining that the percentage of scoreable AA query items exceeds the threshold value, selecting, by the server, one or more first AA query types to create for the viewer, determining, by the server, AA query items to be presented to the viewer based on the selected one or more first AA query types, assigned equity scores of the AA query items, and assigned view-item affinity scores of the AA query items, and creating, by the server, the AA query that includes the determined AA query items to be presented to the viewer on the viewer device of the viewer;
sending, by the server, the created AA query to the viewer device of the viewer, wherein the AA query items from the created AA query are presented on the viewer device of the viewer based on a positional preference of the viewer, the positional preference of the viewer is determined based on monitoring of viewer selections of other AA query items across a plurality of AA queries;
receiving, by the server from the viewer device of the viewer, a response to the sent AA query;
updating, by the server, equity scores and viewer-item affinity scores of a plurality of total scoreable AA query items based on the response, wherein the total scoreable AA query items include the scoreable AA query items for which the viewer has the known or derived preference; and
streaming the requested video content to the viewer device of the viewer with or without adverts based on the response;

wherein determining whether the percentage of scoreable AA query items for which the viewer has the known or derived preference exceeds the threshold value comprises:
 counting, by the server, a number of scoreable AA query items for which the viewer has the known or derived preference, and
 dividing, by the server, the counted number of scoreable AA query items for which the viewer has the known or derived preference by a number of the total scoreable AA query items.

2. The method of claim 1, further comprising:
in response to determining that the percentage of scoreable AA query items does not exceed the threshold value, selecting, by the server, one or more second AA query types to create for the viewer.

3. The method of claim 1, wherein the one or more first AA query types are determined based on at least one of the following:
 the viewer-item affinity scores of the scoreable AA query items,
 demographic attribute of the scoreable AA query items, or
 at least one pseudo-random AA query item.

4. The method of claim 2, wherein the one or more second AA query types are determined based on at least one of the following:
 the equity scores of the scoreable AA query items,
 demographic attribute of the scoreable AA query items,
 at least one pseudo-random AA query item,
 viewer preference information of the viewer, or
 bidding rules.

5. The method of claim 1, further comprising:
respectively deriving or predicting, by the server, an equity score and a viewer-item affinity score for each AA query item having unknown equity and viewer-item affinity scores based on a control parameter.

6. The method of claim 5, wherein respectively deriving or predicting the equity score and the viewer-item affinity score for each AA query item having the unknown equity and viewer-item affinity scores comprises:
 assigning, by the server, the equity score to the AA query item based on at least one of: how often the viewer has seen the AA query item, how often the viewer has selected the AA query item, a ratio of the AA query item being selected to the AA query item being seen, or an amount of revenue the AA query item has generated, and
 assigning, by the server, the viewer-item affinity score to the AA query item based at least on other responses of the viewer to the AA query item.

7. The method of claim 6, wherein the other responses of the viewer to the AA query item include at least one of:
 whether the viewer has accepted an AA offer associated with the AA query item,
 whether the viewer has opened the AA offer associated with the AA query item,
 whether the viewer has completed a selection query and selected the AA query item,
 whether the viewer has completed a ranking query and ranked the AA query item,
 whether the viewer did not complete an AA query but selected the AA query item prior to selecting a graphical user interface element for rejecting an AA offer to watch advert-free content, or
 whether the viewer has seen the AA query item without selecting the AA query item.

8. The method of claim 6, wherein assigning the viewer-item affinity score to the AA query item is further based on a number of times a particular response of the viewer has occurred.

9. The method of claim 6, wherein assigning the viewer-item affinity score to the AA query item comprises:
 assigning, by the server, a first viewer-item affinity score if a rule disqualifies the viewer from seeing the AA query item; or
 assigning, by the server, a second viewer-item affinity score if the viewer has ranked the AA query item better than last place or selected the AA query item prior to selecting a graphical user interface element for rejecting an AA offer to watch advert-free content; or
 assigning, by the server, the second viewer-item affinity score based on a first derived preference of the viewer towards the AA query item; or
 assigning, by the server, a third viewer-item affinity score if the viewer has ranked the AA query item in first place in a completed AA ranking survey; or
 assigning, by the server, the third viewer-item affinity score based on a second derived preference of the viewer towards the AA query item; or
 assigning, by the server, a fourth viewer-item affinity score if the viewer has selected the AA query item in a completed AA selection query; or
 assigning, by the server, a fifth viewer-item affinity score if the viewer has completed an AA query, received an AA offer and opened or accepted the AA offer.

10. The method of claim 2, wherein the one or more first AA query types and the one or more second AA query types to create for the viewer are each determined based on a data table.

11. The method of claim 5, wherein deriving or predicting the equity score and the viewer-item affinity score for each AA query item having the unknown equity and viewer-item affinity scores comprises:
 deriving, by the server, the viewer-item affinity score for the AA query item using a viewer-item affinity score of another AA query item.

12. The method of claim 6, wherein the viewer-item affinity score is assigned to the AA query item based on a viewer-item affinity matrix indicating the viewer's affinity to each of the total scoreable AA query items.

13. The method of claim 12, wherein the viewer-item affinity score is assigned to the AA query item by performing cosine similarity, L1/L2 Norm, matrix factorization, or singular value decomposition (SVD) on the viewer-item affinity matrix.

14. A system, comprising:
one or more processors; and
a memory coupled to the one or more processors to store instructions, which when executed by the one or more processors, cause the one or more processors to perform operations, the operations comprising:
 receiving, from a viewer device of a viewer, a request to generate an AA query and to view video content;
 in response to the request, determining whether a percentage of scoreable AA query items for which the viewer has a known or derived preference exceeds a threshold value, wherein each scoreable AA query item has an assigned equity score and an assigned viewer-item affinity score, the assigned viewer-item affinity score indicates a preference level of the viewer towards the scoreable AA query item and the assigned equity score is used to measure an overall popularity and revenue-generation of the scoreable AA query item;

in response to determining that the percentage of scoreable AA query items exceeds the threshold value, selecting one or more first AA query types to create for the viewer, determining AA query items to be presented to the viewer based on the selected one or more first AA query types, assigned equity scores of the AA query items, and assigned view-item affinity scores of the AA query items, and creating the AA query that includes the determined AA query items to be presented to the viewer on the viewer device of the viewer;

sending the created AA query to the viewer device of the viewer, wherein the AA query items from the created AA query are presented on the viewer device of the viewer based on a positional preference of the viewer, the positional preference of the viewer is determined based on monitoring of viewer selections of other AA query items across a plurality of AA queries;

receiving, from the viewer device of the viewer, a response to the sent AA query;

updating equity scores and viewer-item affinity scores of a plurality of total scoreable AA query items based on the response, wherein the total scoreable AA query items include the scoreable AA query items for which the viewer has the known or derived preference; and streaming the requested video content to the viewer device of the viewer with or without adverts based on the response;

wherein determining whether the percentage of scoreable AA query items for which the viewer has the known or derived preference exceeds the threshold value comprises:
  counting a number of scoreable AA query items for which the viewer has the known or derived preference, and
  dividing the counted number of scoreable AA query items for which the viewer has the known or derived preference by a number of the total scoreable AA query items.

15. The system of claim 14, wherein the operations further comprise:
  in response to determining that the percentage of scoreable AA query items does not exceed the threshold value, selecting one or more second AA query types to create for the viewer.

16. The system of claim 14, wherein the one or more first AA query types are determined based on at least one of the following:
  the viewer-item affinity scores of the scoreable AA query items,
  demographic attribute of the scoreable AA query items, or
  at least one pseudo-random AA query item.

17. The system of claim 15, wherein the one or more second AA query types are determined based on at least one of the following:
  the equity scores of the scoreable AA query items,
  demographic attribute of the scoreable AA query items,
  at least one pseudo-random AA query item,
  viewer preference information of the viewer, or
  bidding rules.

18. The system of claim 14, wherein the operations further comprise:
  respectively deriving or predicting an equity score and a viewer-item affinity score for each AA query item having unknown equity and viewer-item affinity scores based on a control parameter.

19. The system of claim 18, wherein respectively deriving or predicting the equity score and the viewer-item affinity score for each AA query item having the unknown equity and viewer-item affinity scores comprises:
  assigning the equity score to the AA query item based on at least one of: how often the viewer has seen the AA query item, how often the viewer has selected the AA query item, a ratio of the AA query item being selected to the AA query item being seen, or an amount of revenue the AA query item has generated, and
  assigning the viewer-item affinity score to the AA query item based at least on other responses of the viewer to the AA query item.

20. The system of claim 19, wherein the other responses of the viewer to the AA query item include at least one of:
  whether the viewer has accepted an AA offer associated with the AA query item,
  whether the viewer has opened the AA offer associated with the AA query item,
  whether the viewer has completed a selection query and selected the AA query item,
  whether the viewer has completed a ranking query and ranked the AA query item,
  whether the viewer did not complete an AA query but selected the AA query item prior to selecting a graphical user interface element for rejecting an AA offer to watch advert-free content, or
  whether the viewer has seen the AA query item without selecting the AA query item.

21. The system of claim 19, wherein assigning the viewer-item affinity score to the AA query item is further based on a number of times a particular response of the viewer has occurred.

22. The system of claim 19, wherein assigning the viewer-item affinity score to the AA query item comprises:
  assigning a first viewer-item affinity score if a rule disqualifies the viewer from seeing the AA query item; or
  assigning a second viewer-item affinity score if the viewer has ranked the AA query item better than last place or selected the AA query item prior to selecting a graphical user interface element for rejecting an AA offer to watch advert-free content; or
  assigning the second viewer-item affinity score based on a first derived preference of the viewer towards the AA query item; or
  assigning a third viewer-item affinity score if the viewer has ranked the AA query item in first place in a completed AA ranking survey; or
  assigning the third viewer-item affinity score based on a second derived preference of the viewer towards the AA query item; or
  assigning a fourth viewer-item affinity score if the viewer has selected the AA query item in a completed AA selection query; or
  assigning a fifth viewer-item affinity score if the viewer has completed an AA query, received an AA offer and opened or accepted the AA offer.

23. The system of claim 15, wherein the one or more first AA query types and the one or more second AA query types to create for the viewer are each determined based on a data table.

24. The system of claim 18, wherein deriving or predicting the equity score and the viewer-item affinity score for each AA query item having the unknown equity and viewer-item affinity scores comprises:
  deriving the viewer-item affinity score for the AA query item using a viewer-item affinity score of another AA query item.

25. The system of claim 19, wherein the viewer-item affinity score is assigned to the AA query item based on a viewer-item affinity matrix indicating the viewer's affinity to each of the total scoreable AA query items.

26. The system of claim 25, wherein the viewer-item affinity score is assigned to the AA query item by performing cosine similarity, L1/L2 Norm, matrix factorization, or singular value decomposition (SVD) on the viewer-item affinity matrix.

* * * * *